US 12,282,812 B2

(12) United States Patent
Tami et al.

(10) Patent No.: US 12,282,812 B2
(45) Date of Patent: Apr. 22, 2025

(54) INFORMATION PROCESSING SYSTEM

(71) Applicant: NHK SPRING CO., LTD., Yokohama (JP)

(72) Inventors: Kenichiro Tami, Yokohama (JP); Naomi Iida, Yokohama (JP); Shinya Nasubida, Yokohama (JP); Go Kinoshita, Yokohama (JP); Haruhito Suga, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 18/381,298

(22) Filed: Oct. 18, 2023

(65) Prior Publication Data
US 2024/0046057 A1 Feb. 8, 2024
Related U.S. Application Data

(63) Continuation of application No. PCT/JP2022/018067, filed on Apr. 18, 2022.

(30) Foreign Application Priority Data
Apr. 20, 2021 (JP) .................................. 2021-071299

(51) Int. Cl.
G06K 19/06 (2006.01)
(52) U.S. Cl.
CPC .............................. G06K 19/06037 (2013.01)
(58) Field of Classification Search
CPC ............. G06K 19/06037; G06K 19/00; G06K 7/1417; G06K 7/1426
(Continued)

(56) References Cited

U.S. PATENT DOCUMENTS

2001/0029450 A1* 10/2001 Fushimi ................ H04J 3/1688
704/229
2008/0101651 A1* 5/2008 Matsunoshita .... H04N 1/00867
382/100
(Continued)

FOREIGN PATENT DOCUMENTS

CN 107309601 A * 11/2017
JP H7-311813 A 11/1995
(Continued)

OTHER PUBLICATIONS

International Search Report issued on Jul. 12, 2022, for corresponding International Patent Application No. PCT/JP2022/018067, along with an English translation (6 pages).
(Continued)

Primary Examiner — Edwyn Labaze
(74) Attorney, Agent, or Firm — HAUPTMAN HAM, LLP

(57) ABSTRACT

An information processing system includes a first acquisition section acquiring first pattern data from electronic data, a second acquisition section acquiring second pattern data from a database, and a generation section combining the first pattern data with the second pattern data to generate a two-dimensional code. Further, an information processing system includes a first acquisition section acquiring first pattern data from electronic data and a generation section determining the first pattern data to generate a two-dimensional code including the first pattern data.

13 Claims, 20 Drawing Sheets

(58) Field of Classification Search
USPC .................. 235/494, 462.1, 462.09, 375
See application file for complete search history.

(56) References Cited

U.S. PATENT DOCUMENTS

| | | | |
|---|---|---|---|
| 2008/0252066 A1 | 10/2008 | Rapoport et al. | |
| 2011/0049244 A1* | 3/2011 | Wang ............... | G06K 19/06056 |
| | | | 358/1.9 |
| 2018/0234252 A1 | 8/2018 | Guo | |
| 2019/0266460 A1* | 8/2019 | Ushiki ............. | G06K 19/06037 |
| 2020/0226438 A1 | 7/2020 | Walters et al. | |
| 2020/0293846 A1* | 9/2020 | Kim ................. | G06K 19/06037 |
| 2021/0174374 A1 | 6/2021 | Schmitzer et al. | |
| 2023/0161988 A1 | 5/2023 | Sakumoto | |

FOREIGN PATENT DOCUMENTS

| | | | | |
|---|---|---|---|---|
| JP | H11-221990 A | | 8/1999 | |
| JP | 2005-332112 A | | 12/2005 | |
| JP | 2006-195912 A | | 7/2006 | |
| JP | 2006-244097 A | | 9/2006 | |
| JP | 2008-225920 A | | 9/2008 | |
| JP | 2012-226710 A | | 11/2012 | |
| JP | 2015-165342 A | | 9/2015 | |
| JP | 2017-120614 A | | 7/2017 | |
| JP | 2018-28807 A | | 2/2018 | |
| JP | 2020-525882 A | | 8/2020 | |
| JP | 2020123377 A | * | 8/2020 | ............. G06K 1/121 |
| TW | 200849103 A | | 12/2008 | |
| TW | 201830291 A | | 8/2018 | |
| WO | 2015/012827 A1 | | 1/2015 | |
| WO | 2021/245982 A1 | | 12/2021 | |

OTHER PUBLICATIONS

Written Opinion issued on Jul. 12, 2022, for corresponding International Patent Application No. PCT/JP2022/018067 (5 pages).

Office Action issued on Apr. 11, 2023 for corresponding Japanese Patent Application No. 2023-038356, along with an English translation (8 pages).

Notice of Allowance issued on May 23, 2023, for corresponding Japanese Patent Application No. 2023-038356, along with an English translation (5 pages).

Office Action issued on May 1, 2023, for corresponding Taiwanese Patent Application No. 111115077, along with an English translation (79 pages).

English translation of Written Opinion issued on Jul. 12, 2022 for corresponding International Patent Application No. PCT/JP2022/018067 (5 pages).

Office Action issued on Jan. 3, 2024, for corresponding Taiwanese Patent Application No. 111115077, along with an English machine translation (17 pages).

Office Action issued on Mar. 8, 2024 for corresponding Taiwanese Patent Application No. 111115077, along with an English machine translation (16 pages).

Office Action issued on Jun. 26, 2024 for corresponding Taiwanese Patent Application No. 111115077, along with an English machine translation (7 pages).

The extended European Search Report dated Mar. 4, 2025 for corresponding European Patent Application No. 22791709.3, 7 pages.

* cited by examiner

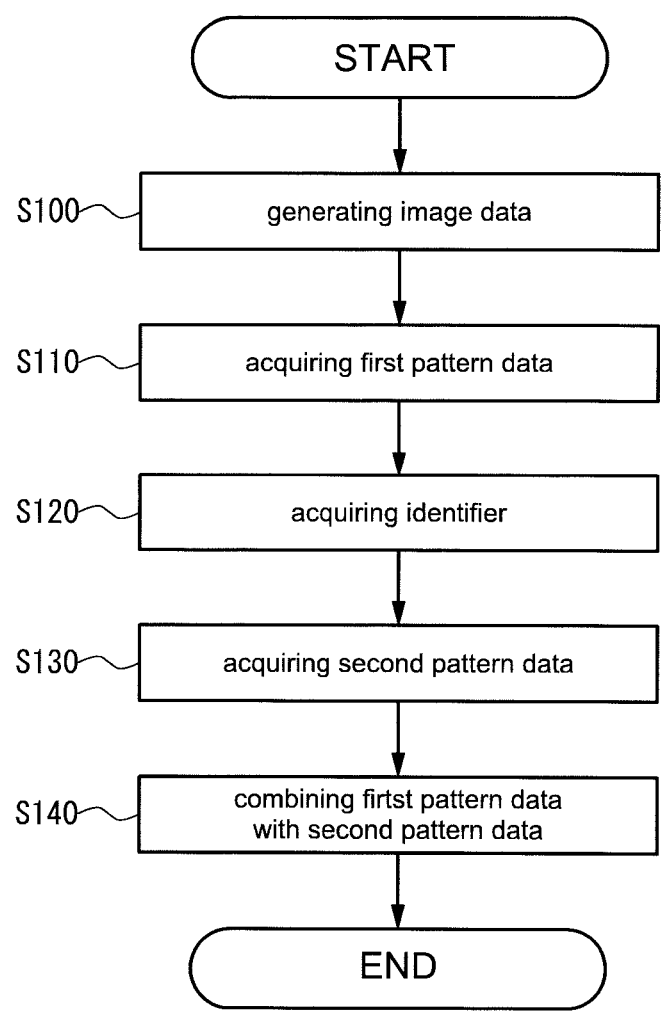

FIG. 4A  FIG. 4B  FIG. 4C
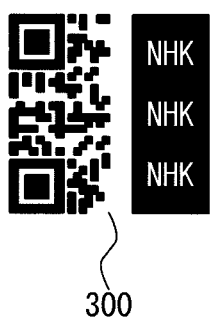
300
310
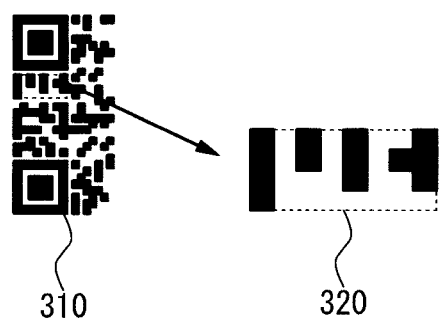
310   320
FIG. 4D
| identifier | <br> | <br> | ... |
|---|---|---|---|
| second pattern data | | | ... |
221
FIG. 4E  FIG. 4F
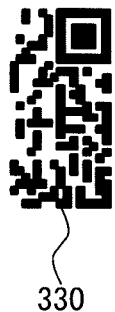
330
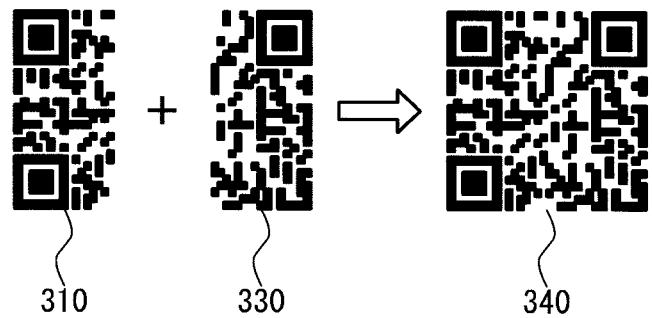
310 + 330 ⇒ 340

FIG. 7A
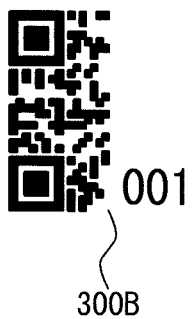
300B
FIG. 7B
310B
FIG. 7C
001
320B
FIG. 7D
| identifier | 001 | 002 | ... |
|---|---|---|---|
| second pattern data |  | | ... |
221B
FIG. 7E
330B
FIG. 7F
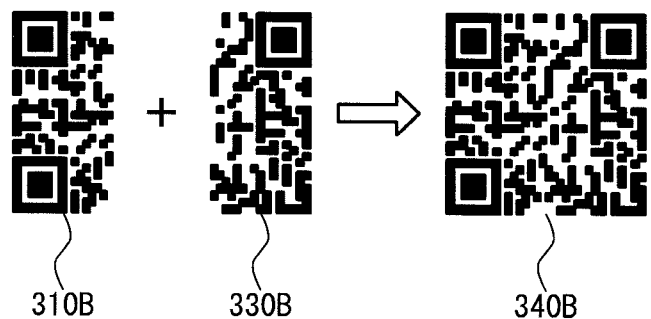
310B  330B  340B FIG. 8A
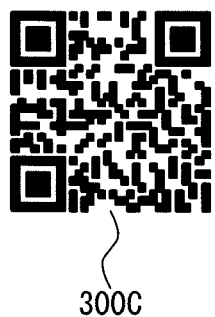
300C
FIG. 8B
310C
FIG. 8C
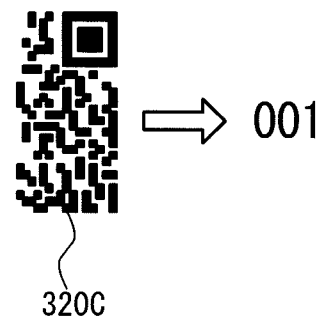 ⇒ 001
320C
FIG. 8D
| identifier | 001 | 002 | ... |
|---|---|---|---|
| second pattern data | | | ... |
221C
FIG. 8E
330C
FIG. 8F
 +  ⇒ 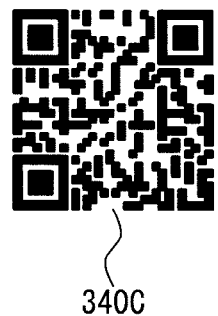
310C   330C   340C FIG. 10
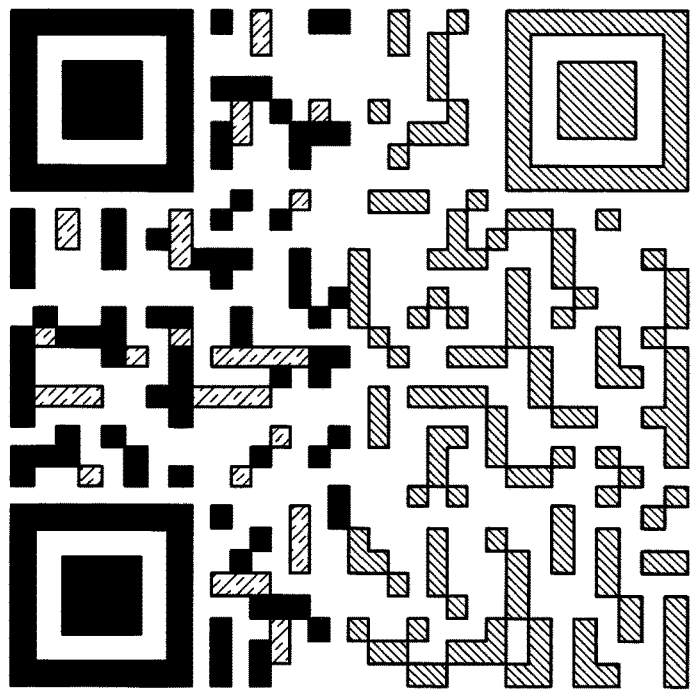
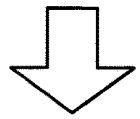
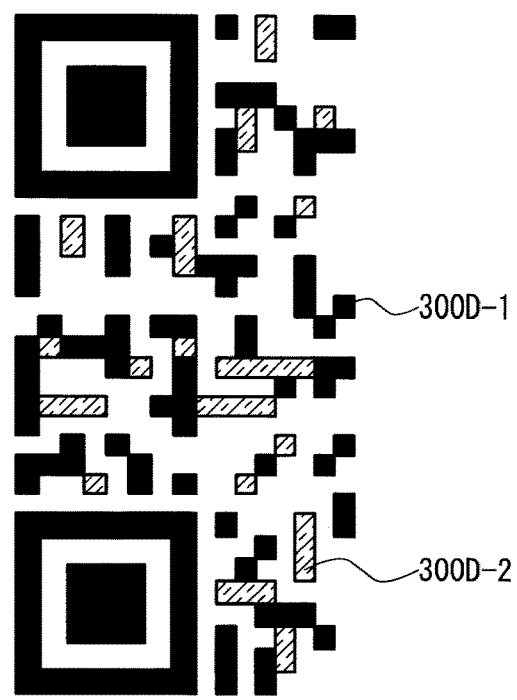

FIG. 11
300D
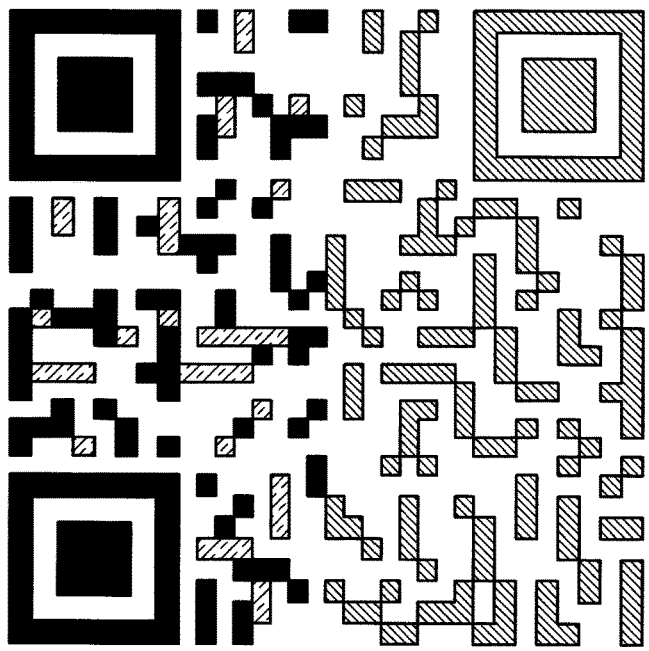
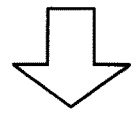
315D
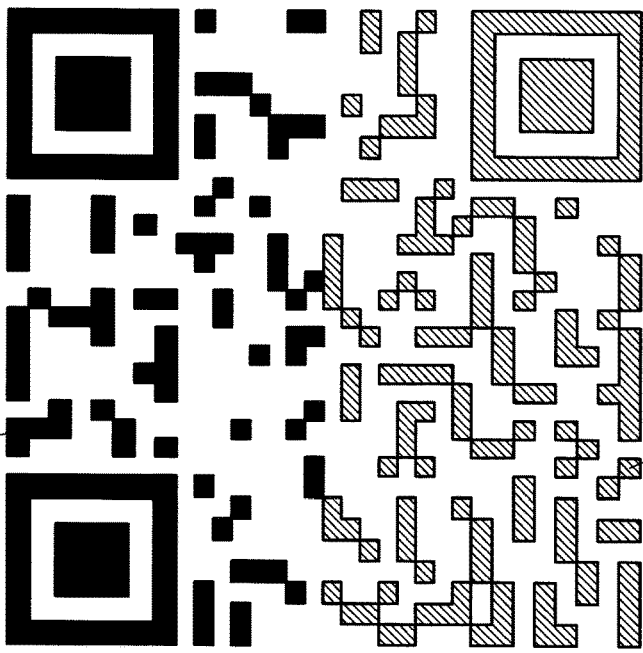
300D-1
300D-3
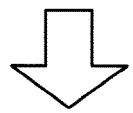
001 ~ 320D FIG.15A
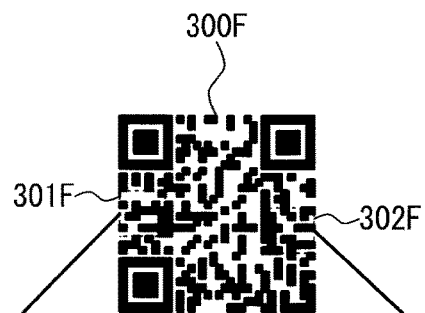
FIG.15B 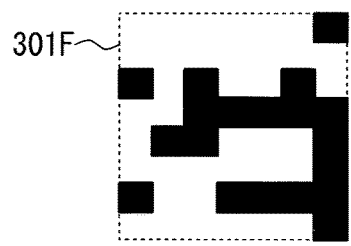 FIG.15C 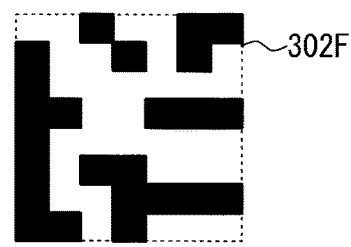
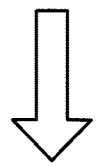 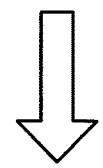
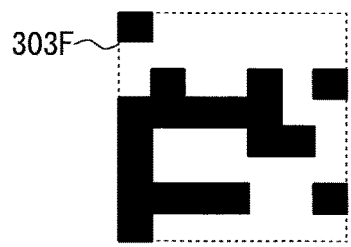 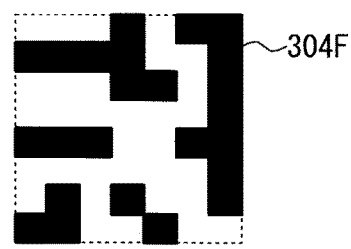
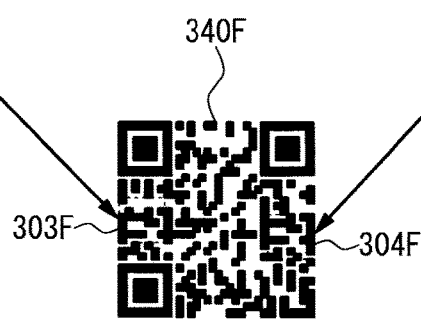
FIG.15D FIG. 18
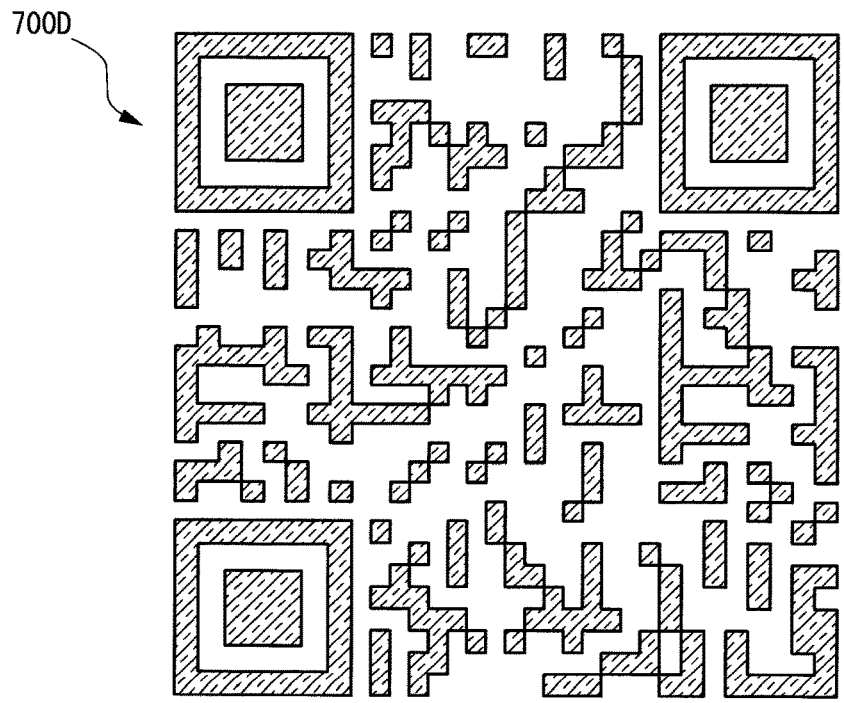
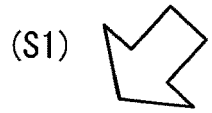
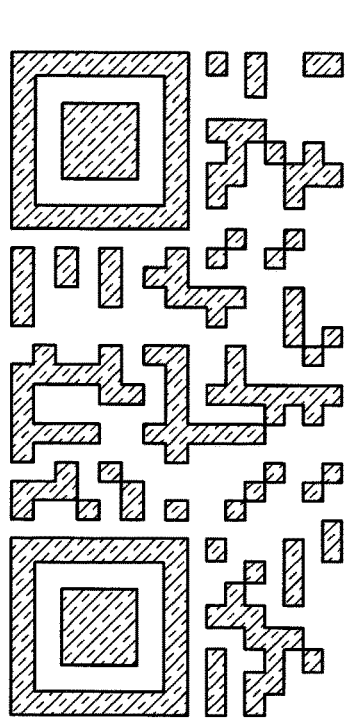
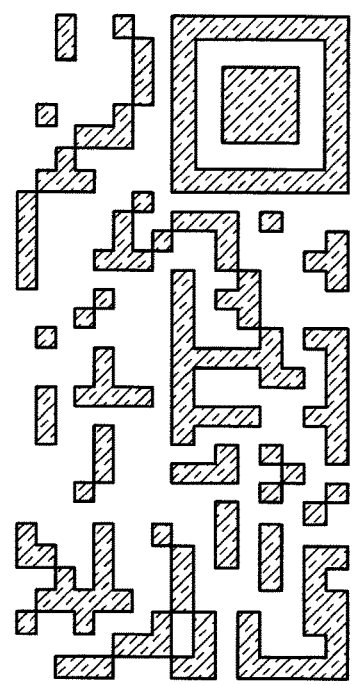

INFORMATION PROCESSING SYSTEM

CROSS-REFERENCE TO RELATED APPLICATIONS

This application is a Continuation of International Patent Application No. PCT/JP2022/018067, filed on Apr. 18, 2022, which claims the benefit of priority to Japanese Patent Application No. 2021-071299, filed on Apr. 20, 2021, the entire contents of which are incorporated herein by reference.

FIELD

An embodiment of the present invention relates to an information processing system for generating a two-dimensional code. Further, an embodiment of the present invention relates to a program for generating a two-dimensional code.

BACKGROUND

A two-dimensional code such as a QR code (registered trademark) includes more information than a one-dimensional barcode, and users can easily obtain a lot of information just by reading the two-dimensional code. Therefore, in recent years, the use of the two-dimensional code has increased in various fields such as process management, inventory management, and payment. For example, Japanese laid-open patent publication No. 2015-165342 discloses a ticket with a two-dimensional code. Furthermore, Japanese laid-open patent publication No. H11-221990 discloses an insurance policy with a two-dimensional code.

SUMMARY

An information processing system according to an embodiment of the present invention includes a first acquisition section acquiring first pattern data from electronic data, a second acquisition section acquiring second pattern data from a database, and a generation section combining the first pattern data with the second pattern data to generate a two-dimensional code.

The first acquisition section may further acquire an identifier from the image data. The second acquisition section may further acquire the second pattern data based on the identifier.

A program according to an embodiment of the present invention is executed on a computer. The program may include acquiring first pattern data from electronic data, acquiring second pattern data from a database, and combining the first pattern data with the second pattern data to generate a two-dimensional code.

The program may further include acquiring an identifier from the image data. The second pattern data may be acquired based on the identifier.

The electronic data may be binary data. Further, the electronic data may be image data.

The second acquisition section may acquire the second pattern data based on at least a portion of the first pattern data.

The identifier may be acquired by executing an OCR processing on the image data. The identifier may be acquired from data other than the first pattern data of the image data. The identifier may be acquired from information included in the image data.

The first pattern data may be acquired by executing a first filtering processing on the image data. The identifier may be acquired by executing a second filtering processing on the image data.

The image data may include a first cell having a first color, a second cell having a second color, and a third cell having a third color. The first color, the second color, and the third color may be different from each other. The first filtering processing may be a color reduction processing or a color addition processing of the third color. The second filtering processing may be a color reduction processing or a color addition processing of the second color.

An information processing system according to an embodiment of the present invention includes a first acquisition section acquiring first pattern data from electronic data and a generation section determining the first pattern data to generate a two-dimensional code including the first pattern data.

The information processing system may further include a storage unit in which a two-dimensional code database including the two-dimensional code is stored. The first pattern data may be determined based on the two-dimensional code database.

A program according to an embodiment of the present invention is executed on a computer. The program may include acquiring first pattern data from electronic data and determining the first pattern data to generate a two-dimensional code.

The first pattern data may be determined based on the two-dimensional code database.

The first pattern data may be determined using a two-dimensional code determination learning model that has learned to output the two-dimensional code when the first pattern data is input.

An information processing system according to an embodiment of the present invention includes a generation section executing a predetermined conversion processing on a predetermined region that is a part of electronic data to generate a two-dimensional code.

A program according to an embodiment of the present invention is executed on a computer. The program may include executing a predetermined conversion processing on a predetermined region that is a part of electronic data to generate a two-dimensional code.

The predetermined conversion processing may be a reversal processing, a rotation processing, a negative/positive reversal processing, a replacement processing, or a combination thereof.

The two-dimensional code may be a QR code (registered trademark).

A program according to an embodiment of the present invention is executed on a computer. The program includes extracting first pattern data that is a part of a first two-dimensional code including authorized information.

The program may further include generating an identifier identifying the first two-dimensional code and generating a composite code in which the first pattern data and the identifier are combined.

The electronic data may have a first color, a second color, and a third color. The first pattern data may have the second color. The identifier may be a second two-dimensional code having the third color. The first pattern data and the identifier may be combined so that a portion where the first pattern data and the second two-dimensional code overlap is converted to the first color.

A program according to an embodiment of the present invention is executed on a computer. The program includes executing a predetermined conversion processing on a predetermined region that is a part of a first two-dimensional code including authorized information to generate a second two-dimensional code.

The first two-dimensional code may be a QR code (registered trademark).

BRIEF DESCRIPTION OF DRAWINGS

FIG. 3 is a flowchart of a two-dimensional code generation processing executed by an information processing system according to an embodiment of the present invention.

FIG. 4A is a schematic diagram illustrating a two-dimensional code generation processing executed by an information processing system 10 according to an embodiment of the present invention.

FIG. 4B is a schematic diagram illustrating a two-dimensional code generation processing executed by an information processing system 10 according to an embodiment of the present invention.

FIG. 4C is a schematic diagram illustrating a two-dimensional code generation processing executed by an information processing system 10 according to an embodiment of the present invention.

FIG. 4D is a schematic diagram illustrating a two-dimensional code generation processing executed by an information processing system 10 according to an embodiment of the present invention.

FIG. 4E is a schematic diagram illustrating a two-dimensional code generation processing executed by an information processing system 10 according to an embodiment of the present invention.

FIG. 4F is a schematic diagram illustrating a two-dimensional code generation processing executed by an information processing system 10 according to an embodiment of the present invention.

FIG. 7A is a schematic diagram illustrating a two-dimensional code generation processing executed by an information processing system according to an embodiment of the present invention.

FIG. 7B is a schematic diagram illustrating a two-dimensional code generation processing executed by an information processing system according to an embodiment of the present invention.

FIG. 7C is a schematic diagram illustrating a two-dimensional code generation processing executed by an information processing system according to an embodiment of the present invention.

FIG. 7D is a schematic diagram illustrating a two-dimensional code generation processing executed by an information processing system according to an embodiment of the present invention.

FIG. 7E is a schematic diagram illustrating a two-dimensional code generation processing executed by an information processing system according to an embodiment of the present invention.

FIG. 7F is a schematic diagram illustrating a two-dimensional code generation processing executed by an information processing system according to an embodiment of the present invention.

FIG. 8A is a schematic diagram illustrating a two-dimensional code generation processing executed by the information processing system according to an embodiment of the present invention.

FIG. 8B is a schematic diagram illustrating a two-dimensional code generation processing executed by the information processing system according to an embodiment of the present invention.

FIG. 8C is a schematic diagram illustrating a two-dimensional code generation processing executed by the information processing system according to an embodiment of the present invention.

FIG. 8D is a schematic diagram illustrating a two-dimensional code generation processing executed by the information processing system according to an embodiment of the present invention.

FIG. 8E is a schematic diagram illustrating a two-dimensional code generation processing executed by the information processing system according to an embodiment of the present invention.

FIG. 8F is a schematic diagram illustrating a two-dimensional code generation processing executed by the information processing system according to an embodiment of the present invention.

FIG. 10 is a schematic diagram illustrating an acquisition processing of first pattern data executed by a first acquisition section of an information processing system according to an embodiment of the present invention.

FIG. 11 is a schematic diagram illustrating an acquisition processing of an identifier executed by a first acquisition section of an information processing system according to an embodiment of the present invention.

FIG. 15A is a schematic diagram illustrating a two-dimensional code generation processing executed in the information processing system according to an embodiment of the present invention.

FIG. 15B is a schematic diagram illustrating a two-dimensional code generation processing executed in the information processing system according to an embodiment of the present invention.

FIG. 15C is a schematic diagram illustrating a two-dimensional code generation processing executed in the information processing system according to an embodiment of the present invention.

FIG. 15D is a schematic diagram illustrating a two-dimensional code generation processing executed in the information processing system according to an embodiment of the present invention.

FIG. 18 is a schematic diagram illustrating a composite code generation process executed by an information processing device according to an embodiment of the present invention.

DESCRIPTION OF EMBODIMENTS

Figure 1:
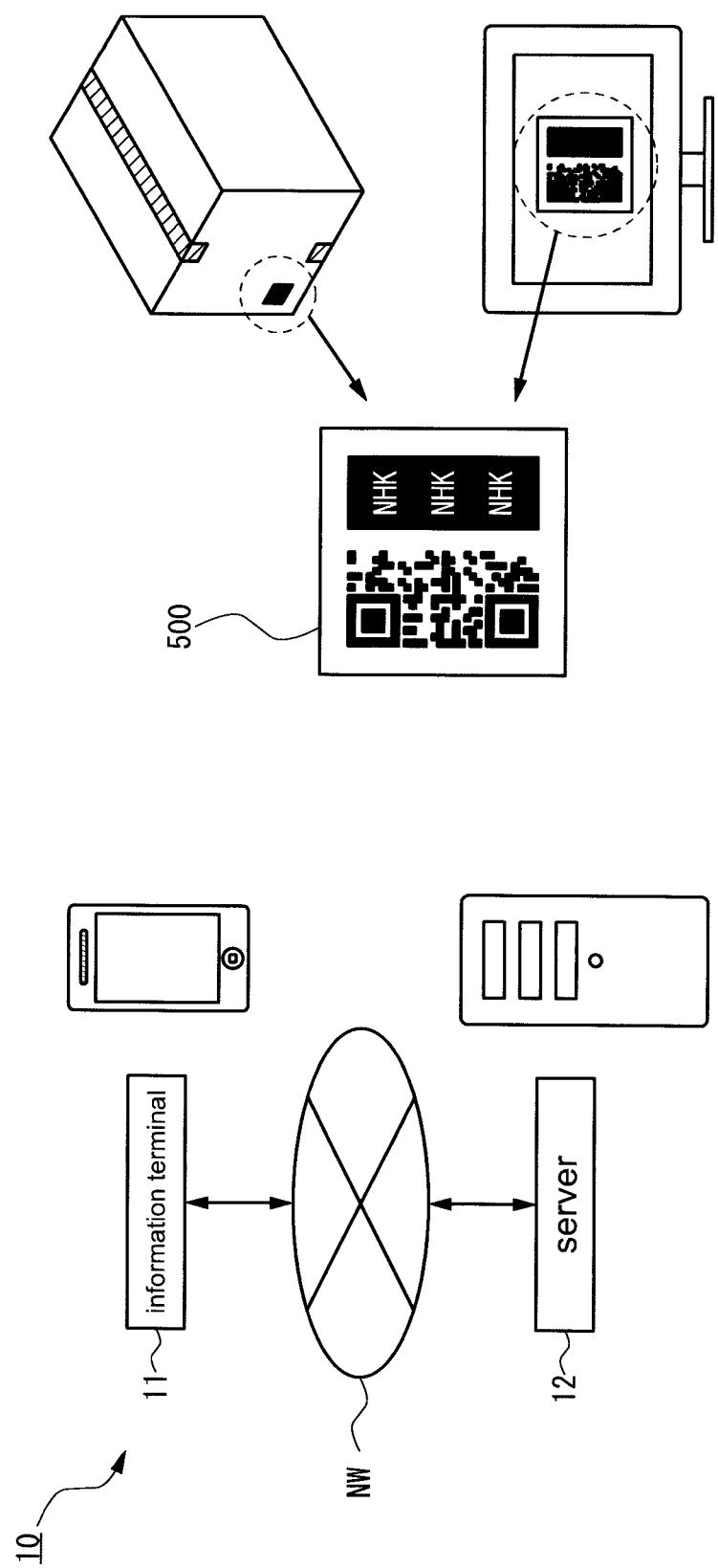
FIG. 1 is a block diagram illustrating an outline of an information processing system according to an embodiment of the present invention.

Two-dimensional codes are often copied by a copying machine and used illegally (i.e., two-dimensional codes are forged). Therefore, in order to prevent the forgery of two-dimensional codes, Japanese laid-open patent publication No. 2015-165342 discloses a two-dimensional code that uses inks with different reflective properties. Further, Japanese laid-open patent publication No. H11-221990 discloses a two-dimensional code that is attached with a dummy image when it is copied.

The main purpose of Japanese laid-open patent publication Nos. 2015-165342 and H11-221990 is to prevent the forgery of the two-dimensional code of the printed matter that is reproduced by the copying machine. However, in recent years, after the two-dimensional code is read by information terminals such as smartphones, the read electronic data itself is increasingly used. Therefore, in the use of the two-dimensional code, it is required to prevent duplication of electronic data.

In view of the above-mentioned problems, one object of an embodiment of the present invention is to provide an information processing that can convert acquired electronic data into a two-dimensional code including authorized information and provide the two-dimensional code or the information accompanying the two-dimensional code as regular content. Further one object of an embodiment of the present invention is to provide a program that can convert acquired electronic data into a two-dimensional code including authorized information.

Each embodiment of the present invention is described below while referring to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the specification and the drawings, the same reference numerals are provided to the same elements as those described previously with reference to preceding figures and repeated explanations may be omitted accordingly.

In the specification and the drawings, the same reference numerals may be used when multiple configurations are identical or similar in general, and reference numerals with an upper case letter of the alphabet may be used when the multiple configurations are distinguished. Further, reference numerals with a hyphen and a natural number may be used when multiple portions of one configuration are distinguished.

In the specification, terms such as "first", "second", or "third" attached to each configuration are convenient terms used to distinguish each configuration, and have no further meaning unless otherwise explained.

In the specification, "two-dimensional code" refers to a code in a two-dimensional display format that has information in the horizontal and vertical directions. For example, although the two-dimensional code is a QR code (registered trademark), the two-dimensional code is not limited thereto.

First Embodiment

An information processing system 10 according to an embodiment of the present invention is described with reference to FIGS. 1 to 5.

[1. Outline of Information Processing System 10]

FIG. 1 is a block diagram illustrating an outline of an information processing system 10 according to an embodiment of the present invention.

As shown in FIG. 1, the information processing system 10 includes an information terminal 11 and a server 12. The information terminal 11 can be communicatively connected to the server 12 via a network NW. The network NW may be wired or wireless. Although the network NW is, for example, a LAN (Local Area Network) or the Internet, the network NW is not limited thereto.

The information terminal 11 is a terminal that can acquire data or information from a composite code 500. Although the information terminal 11 is, for example, a mobile phone, a smartphone, a tablet, or a personal computer, the information terminal 11 is not limited thereto. For example, the information terminal 11 can capture the composite code 500 attached to an article or displayed on a screen to acquire electronic data corresponding to the composite code 500. In addition, the composite code 500 is not limited to being printed on a printed matter or directly on an article. The composite code 500 may be displayed on a display device. That is, the composite code 500 may be electronic data.

The server 12 is a software or a computer that can be provided with data or information from the information terminal 11 to generate a dimensional code. In addition, when the server 12 is a computer, the server 12 may be one computer or multiple computers.

As described above, the information processing system 10 includes the information terminal 11 and the server 12, and the data or information based on the composite code 500 acquired by the information terminal 11 is transmitted to the server 12. The server 12 generates the two-dimensional code based on the transmitted data or information. In addition, the information processing system can also generate the two-dimensional code using a cloud computing method or an ASP (Application Service Provider) method.

[2. Configuration of Information Processing System 10]

Figure 2:
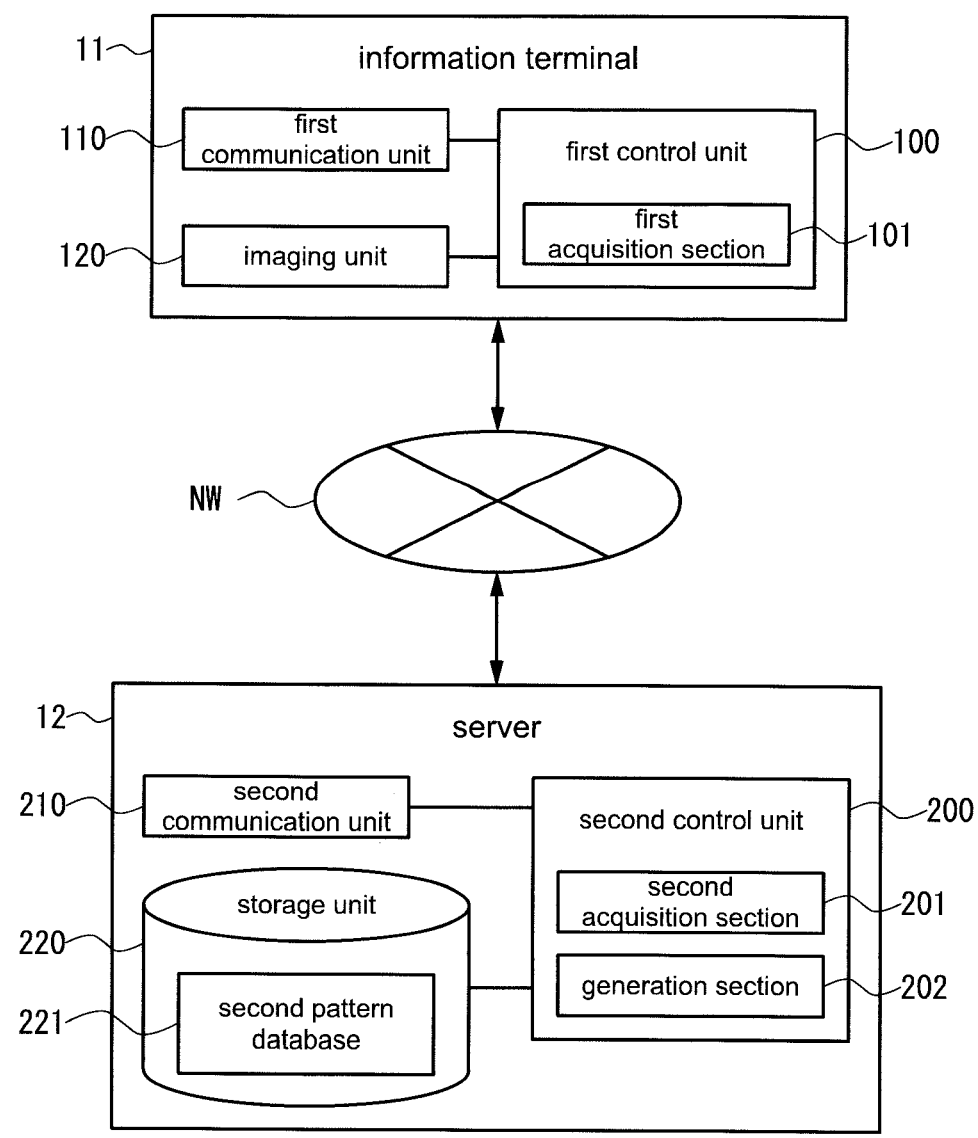
FIG. 2 is a block diagram showing a configuration of an information processing system according to an embodiment of the present invention.
Figure 5:
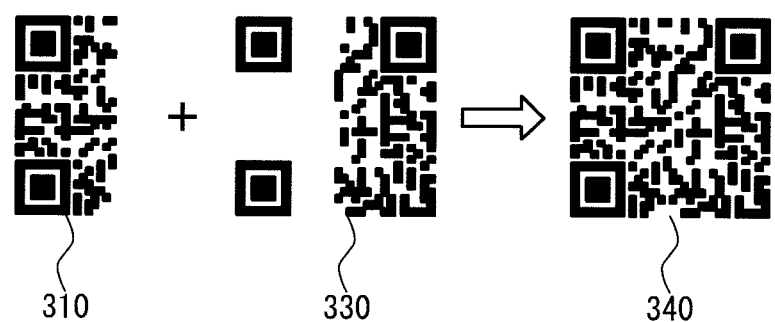
FIG. 5 is a schematic diagram illustrating a two-dimensional code generation processing executed by an information processing system 10 according to an embodiment of the present invention.

FIG. 2 is a block diagram showing a configuration of the information processing system 10 according to an embodiment of the present invention.

As shown in FIG. 2, the information terminal 11 of the information processing system 10 includes a first control unit 100, a first communication unit 110, and an imaging unit 120. Further, the server 12 of the information processing system 10 includes a second control unit 200, a second communication unit 210, and a storage unit 220. Further, the first control unit 100 includes a first acquisition section 101, and the second control unit 200 includes a second acquisition section 201 and a generation section 202.

The first control unit 100 and the second control unit 200 are computers that can execute an arithmetic processing using data or information. The first control unit 100 and the second control unit 200 include, for example, a central processing unit (CPU), a micro processing unit (MPU), a graphics processing unit (GPU), or a random access memory (RAM). Specifically, when the first control unit 100 and the second control unit 200 execute a program, the first acquisition section 101, the second acquisition section 201, and the generation section 202 can function. In addition, details of the first acquisition section 101, the second acquisition section 201, and the generation unit 202 are described later.

The first communication unit 110 and the second communication unit 210 are communication interfaces that can transmit or receive data or information by wire or wirelessly. The first communication unit 110 and the second communication unit 210 can be, for example, a LAN module or a Wi-Fi (registered trademark) module.

The imaging unit 120 is an imaging device that can capture (photograph) the composite code 500. Specifically, the imaging unit 120 can capture the composite code 500 to generate electronic data corresponding to the composite code 500. Although the electronic data may be binary data or image data, in the following description, it is described that the imaging unit 120 generates the image data for convenience. For example, a camera or a scanner can be used as the imaging unit 120.

The storage unit 220 is storage that can store data or information. Specifically, the storage unit 220 can store a second pattern database 221 and the like. In addition, although a plurality of second pattern data is registered in the second pattern database 221, details of the second pattern database 221 are described later. For example, a hard disk drive (HDD), a solid state drive (SSD), a read only memory (ROM), a random access memory (RAM), a flash memory, or the like can be used as the storage unit 220.

The first acquisition section 101 acquires (extracts) first pattern data from the image data of the composite code 500 generated by the imaging unit 120. In addition, details of the first pattern data and the first pattern data acquisition process executed by the first acquisition section 101 are described later.

The second acquisition section 201 acquires an identifier from at least a portion of the first pattern data. The identifier includes information that identifies the first pattern data. Further, the second acquisition section 201 acquires second pattern data from the second pattern database 221 of the storage unit 220 based on the acquired identifier. In addition, details of the identifier, the second pattern data, and the acquisition processing of the identifier and the second pattern data that are executed by the second acquisition section 201 are described later.

The generation section 202 combines the first pattern data and the second pattern data to generate a two-dimensional code. In addition, details of the combination processing of the first pattern data and the second pattern data that is executed by the generation section 202 are described later.

[3. Two-Dimensional Code generation processing of Information Processing System 10]

FIG. 3 is a flowchart of a two-dimensional code generation processing executed by the information processing system 10 according to an embodiment of the present invention. Further, FIGS. 4A to 4F and FIG. 5 are schematic diagrams illustrating the two-dimensional code generation processing executed by the information processing system 10 according to an embodiment of the present invention.

The two-dimensional code generation processing starts when a two-dimensional code generation processing program is executed on the information terminal 11.

In step S100, the imaging unit 120 generates image data 300 of the composite code 500 (see FIG. 4A). For example, the image data 300 can be generated when a user captures the composite code 500 using the information terminal 11. Although the image data 300 includes a part of a two-dimensional code, the image data 300 is not the complete two-dimensional code. That is, since the image data 300 is the two-dimensional code having a defect, it is impossible to acquire the authorized information included in the two-dimensional code from the image data 300. Further, when the composite code 500 includes a part of a QR code (registered trademark) as the two-dimensional code, the part of the QR code is not the complete QR code (registered trademark) and it is difficult to read the part of the QR code by an existing QR code (registered trademark) reader.

In step S110, the first acquisition section 101 acquires first pattern data 310 from the image data 300 (see FIG. 4B). The first pattern data 310 is a part of the two-dimensional code. The first acquisition section 101 can acquire a predetermined region of the image data 300 as the first pattern data 310. Further, the first acquisition section 101 can also acquire the first pattern data using image recognition. For example, the first acquisition section 101 can apply a first pattern data extraction learning model to the image data 300 and acquire the first pattern data 310. Here, the first pattern data extraction leaning model is a learning model in which the first pattern data 310 and other parts in the image data 300 are determined so that the first pattern data 310 is output when the image data 300 is input. The first pattern data extraction learning model can learn using deep learning, neural network, machine learning, or the like. Further, the first pattern data extraction learning model is stored in the storage unit 220.

In addition, the acquired first pattern data 310 is transmitted from the information terminal 11 to the server 12.

In step S120, the second acquisition section 201 acquires an identifier 320 from the first pattern data 310 (see FIG. 4C). The identifier 320 includes information that can identify the first pattern data 310. Therefore, the identifier 320 may be a part of the first pattern data 310. The second acquisition section 201 can acquire a predetermined region of the first pattern data 310 as the identifier 320. Further, the second acquisition section 201 can also acquire the identifier 320 using image recognition. For example, the second acquisition section 201 can apply the identifier determination learning model to the first pattern data 310 to acquire the identifier 320. Here, the identifier determination learning model is a learning model in which the first pattern data is determined so that the identifier 320 corresponding to the first pattern data 310 is output when the first pattern data 310 is input. The identifier determination learning model can learn using deep learning, neural networks, machine learning, or the like. Further, the identifier determination learning model is stored in the storage unit 220.

In step S130, the second acquisition section 201 acquires second pattern data 330 (see FIG. 4E) from the second pattern database 221 (see FIG. 4D) based on the identifier 320. The second pattern data 330 is a part of the two-dimensional code. In the second pattern database 221, the identifier 320 and second pattern data 330 are associated with each other and registered. Therefore, the second acquisition section 201 can search for the identifier 320 of the first pattern data 310 in the second pattern database 221 to acquire the second pattern data 330 associated with the identifier 320.

In step S140, the generation section 202 combines the first pattern data 310 with the second pattern data 330 to generate a two-dimensional code 340 (see FIG. 4F). The generation section 202 can combine the first pattern data 310 with the second data pattern 330 based on the direction and the edge of the first pattern data 310, the direction and the edge of the second pattern data 330, and the cutout symbol of the first pattern data 310 or the second pattern data 330. Since the two-dimensional code 340 is a complete two-dimensional code (that is, a two-dimensional code without a defect), the authorized information can be acquired from the two-dimensional code 340.

The generated two-dimensional code 340 may be transmitted from the server 12 to the information terminal 11. Since the generated two-dimensional code 340 includes the authorized information, information accompanying the generated two-dimensional code 340 (for example, URL information, process management information, inventory management information, payment information, product information, product authenticity determination information, etc.) may be transmitted from the server 12 to the information terminal 11.

The two-dimensional code generation process ends by executing step S140.

In the two-dimensional code generation process described above, the second pattern data 330 can also be acquired based on the first pattern data 310 without acquiring the identifier 320. In this case, the second pattern data 330 of the second pattern database 221 is associated with the first pattern data 310.

Further, in this case, the second acquisition section 201 can apply the second pattern data determination learning model to the first pattern data 310 to acquire the second pattern data 330. Here, the second pattern data determination learning model is a learning model in which the first pattern data 310 is determined and the second pattern data 330 corresponding to the first pattern data 310 is output when the first pattern data 310 is input. The second pattern data determination learning model can lean using deep learning, neural network, machine learning, or the like. Further, the second pattern data determination learning model is stored in the storage unit 220.

Further, in the two-dimensional code generation process described above, although the first acquisition section 101 of the information terminal 11 acquires the first pattern data 310 from the image data 300, the first acquisition section 101 may be included in the server 12. In this case, the image data 300 is transmitted from the information terminal 11 to the server 12, and the first pattern data 310 is acquired from the image data 300 in the first acquisition section 101 of the server 12.

Furthermore, in the two-dimensional code generation process described above, although the second acquisition section 201 acquires the identifier 320 from the first pattern data 310; the first acquisition section 101 may acquire the identifier 320 from the first pattern data 310. In this case, the first pattern data 310 and the identifier 320 are transmitted from information terminal 11 to the server 12.

Moreover, in the two-dimensional code generation process described above, although the generated two-dimensional code 340 combines the first pattern data 310 and the second pattern data 330, which are divided into left and right parts, the two-dimensional code 340 may be one that combines pattern data that are divided into upper and lower parts. Further, the first pattern data 310 and the second pattern data 330 may have the same size (area) or shape, or may have different sizes or shapes. Furthermore, the combining portion between the first pattern data 310 and the second pattern data 330 may be a straight line or a curved line. Further, the second pattern data 330 may include a part of the first pattern data 310. For example, the second pattern data 330 may include the cutout symbols of the first pattern data 310. In this case, the cutout symbols of the second pattern data 330 can overlap the cutout symbols of the first pattern data 310, and the first pattern data 310 and the second pattern data 330 can be combined (see FIG. 5).

In addition, in the two-dimensional code generation process described above, although the generated two-dimensional code 340 is divided into two parts, the two-dimensional code 340 may be divided into n parts (n is a natural number of 2 or more).

According to this embodiment, the information processing system 10 generates the two-dimensional code 340 including the authorized information from the image data 300 of the composite code 500. That is, the information presented to the user is the two-dimensional code 340 including the authorized information acquired by converting the image data 300 by the information processing system 10 or information accompanying the two-dimensional code.

On the other hand, simply reading the composite code 500 with the information terminal 11 does not allow acquiring the two-dimensional code 340 including the authorized information. Therefore, it is possible to prevent the two-dimensional code from being electronically duplicated.

<Modification 1>

An information processing system 10A that is a modification of the information processing system 10 is described with reference to FIG. 6. In addition, when a configuration of the information processing system 10A is similar to the configuration of the information processing system 10, the description thereof may be omitted.

Figure 6:
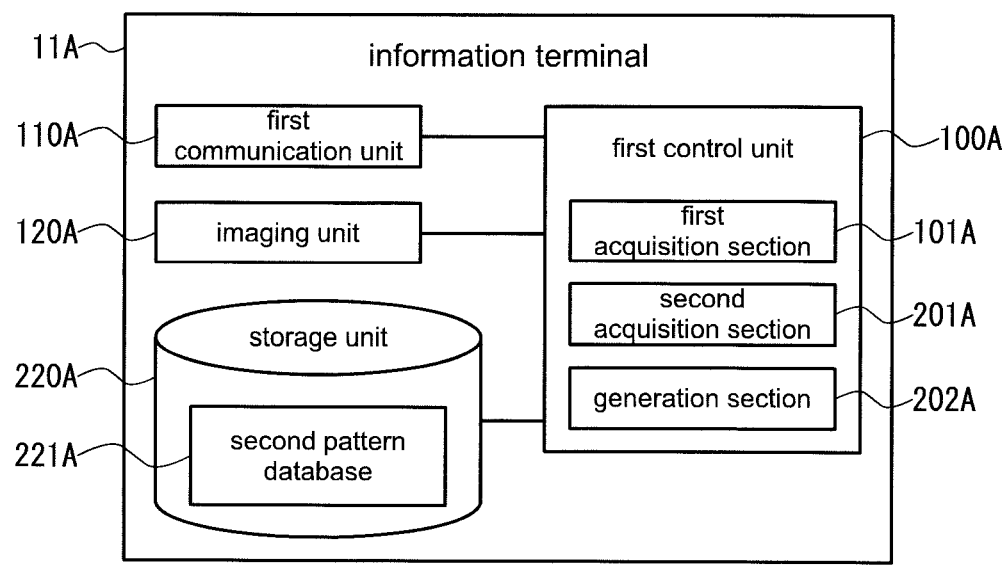
FIG. 6 is a block diagram showing a configuration of an information processing system according to an embodiment of the present invention.

FIG. 6 is a block diagram showing a configuration of an information processing system 10A according to an embodiment of the present invention.

As shown in FIG. 6, the information terminal 11A of the information processing system 10A includes a first control unit 100A, a first communication unit 110A, an imaging unit 120A, and a storage unit 220A. Further, the first control unit 100A includes a first acquisition section 101A, a second acquisition section 201A, and a generation section 202A.

The information processing system 10A can execute a two-dimensional code generation processing only on the information terminal 11A without the server 12 by installing a program on the information terminal 11A. Further, the information processing system 10A stores a program in a recording medium (for example, a CD-ROM or DVD-ROM), and reads the recording medium with the information terminal 11, so that the two-dimensional code generation processing can be executed only with the information terminal 11A.

<Modification 2>

Another modification of the information processing system 10 according to the First Embodiment is described with reference to FIGS. 7A to 7F. In this modification, image data 300B is used instead of the image data 300. In addition, when a configuration of this modification is similar to the configuration described above, the description thereof may be omitted.

FIGS. 7A to 7F are schematic diagrams illustrating a two-dimensional code generation processing executed by the information processing system 10 according to an embodiment of the present invention.

In this modification, in step S100, the imaging unit 120 generates image data 300B of the composite code (see FIG. 7A). Further, in step S110, the first acquisition section 101 acquires the first pattern data 310B (see FIG. 7B) from the image data 300B.

In step S120, the first acquisition section 101 acquires the identifier 320B (see FIG. 7C) from the image data 300B. The identifier 320B is arranged in a different position from the first pattern data 310B in the image data 300B. That is, the identifier 320 is not a part of the first pattern data 310B and does not overlap the first pattern data 310B. Further, the identifier 320B is character information. Therefore, the first acquisition section 101 can acquire the identifier 320B by executing a character recognition processing, for example, OCR (Optical Character Recognition) processing on the image data 300B. In addition, the identifier 320B may be converted to numerical information.

In step S130, the second acquisition section 201 acquires the second pattern data 330B (see FIG. 7E) from the second pattern database 221B (see FIG. 7D) based on the identifier 320B. Further, in step S140, the generation section 202 combines the first pattern data 310B with the second pattern data 330B to generate a two-dimensional code 340B (see FIG. 7F).

<Modification 3>

Another modification of the information processing system 10 according to the First Embodiment is described with reference to FIGS. 8A to 8F. In this modification, image data 300C is used instead of the image data 300. In addition, when a configuration of this modification is similar to the configuration described above, the description thereof may be omitted.

FIGS. 8A to 8F are schematic diagrams illustrating a two-dimensional code generation processing executed by the information processing system 10 according to an embodiment of the present invention.

In this modification, in step S100, the imaging unit 120 generates the image data 300C of the composite code (see FIG. 8A). Although the image data 300C is a two-dimensional code, the image data 300C does not include information that should originally be acquired (authorized information).

Therefore, even when the image data 300C is merely acquired, it is not possible to acquire the authorized information. In other words, the image data 300C can include dummy information.

In step S110, the first acquisition section 101 acquires first pattern data 310C (see FIG. 8B) from the image data 300C.

In step S120, the first acquisition section 101 acquires the identifier 320C from the image data 300C. Specifically, although the first acquisition section 101 can acquire the identifier 320C from data other than the first pattern data 310C of the image data 300C (see FIG. 8C), the acquisition of the identifier 320C is not limited thereto. The first acquisition section 101 can also acquire the identifier 320C by using the function of the two-dimensional code included in the image data 300C (that is, by acquiring the information included in the image data 300C). The identifier 320C may be pattern data or character information. Therefore, in FIG. 8C, for convenience, the identifier 320C is shown as "001" which is character information (or numerical information).

In step S130, the second acquisition section 201 acquires second pattern data 330C (see FIG. 8E) from a second pattern database 221C (see FIG. 8D) based on the identifier 320C. Further, in step S140, the generation section 202 combines the first pattern data 310C with the second pattern data 330C to generate a two-dimensional code 340C (see FIG. 8F).

In addition, the modifications of the First Embodiment are not limited to Modifications 1 to 3.

As described above, in Modifications 1 to 3 of this embodiment, since it is not possible to acquire the two-dimensional code including authorized information by simply reading the composite code with an information terminal, the electronic duplication of the two-dimensional code can be prevented.

Second Embodiment

An information processing system 10D according to an embodiment of the present invention is described with reference to FIGS. 9 to 12. In addition, when a configuration of the information processing system 10D is similar to the configuration of the information processing system 10, the description thereof may be omitted.

Figure 9:
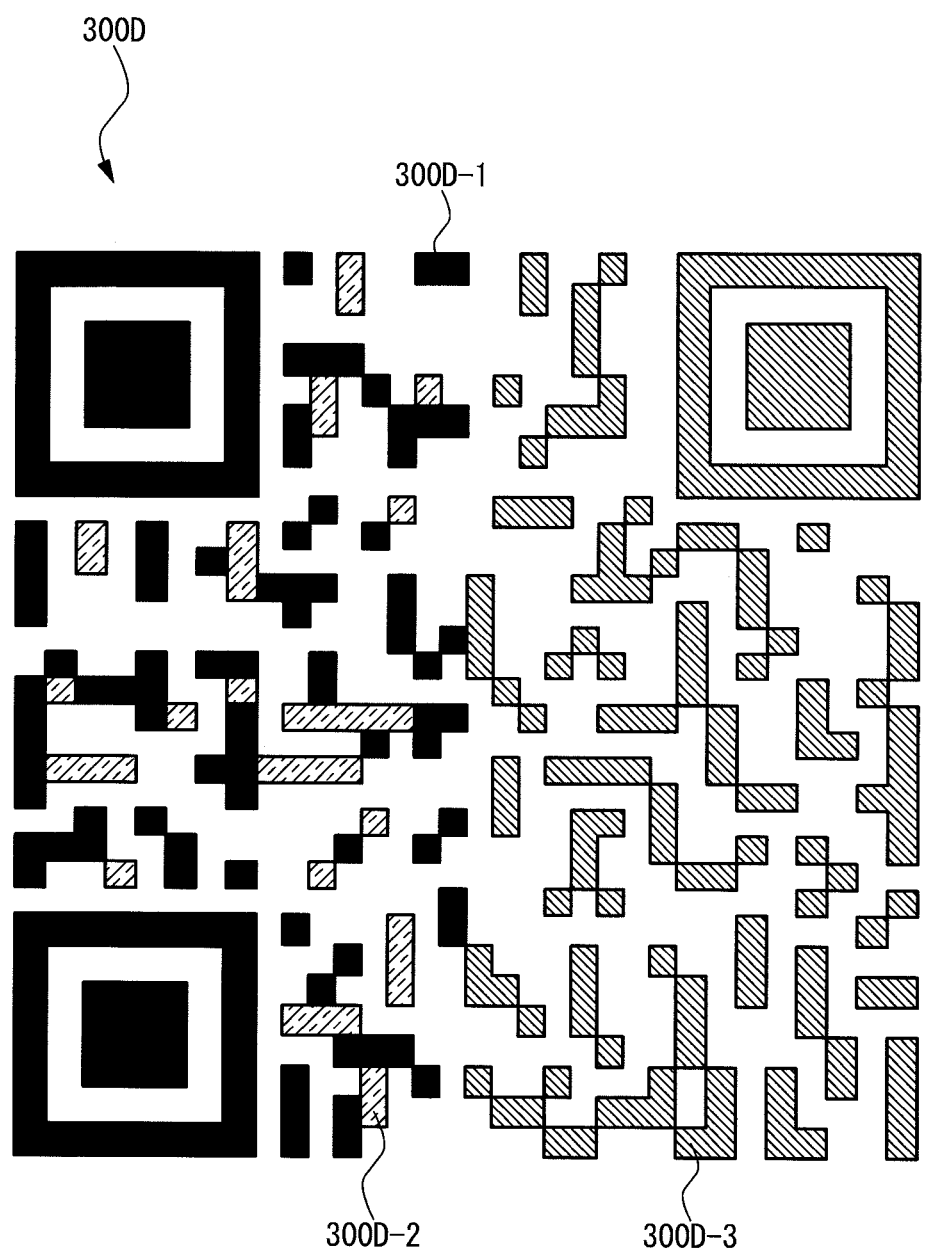
FIG. 9 is a schematic diagram illustrating image data generated by an imaging unit of the information processing system according to an embodiment of the present invention.

FIG. 9 is a schematic diagram illustrating image data 300D generated by an imaging unit 120D of the information processing system 10D according to an embodiment of the present invention.

The image data 300D includes first cells 300D-1 having a first color, second cells 300D-2 having a second color, and third cells 300D-3 having a third color. Further, the image data 300D is a two-dimensional code. That is, the composite code captured by an imaging unit 120D is also a two-dimensional code including the first cells 300D-1 having the first color, the second cells 300D-2 having the second color, and the third cells 300D-3 having the third color. The first color, the second color, and the third color are any colors that are different from each other. However, it is preferable that the second color is a complementary color of the third color. For example, when the second color is red, the third color is blue-green. Further, when the second color is reddish-purple, the third color is green.

FIG. 10 is a schematic diagram illustrating an acquisition processing of first pattern data 310D executed by a first acquisition section 101D of the information processing system 10D according to an embodiment of the present invention.

The first acquisition section 101D executes a first filtering processing to acquire the first pattern data 310D from the image data 300D. The first filtering processing is a color reduction processing of the third color. When the first filtering processing is executed on the image data 300D, the third cells 300D-3 having the third color can be deleted. Therefore, by the first filtering processing, the image data 300D is converted into the first pattern data 310D including the first cells 300D-1 having the first color and the second cells 300D-2 having the second color.

In addition, the first filtering processing may be a color addition processing of the third color on the image data 300D. In this case, since the background of the image data 300D and the third cells 300D-3 have the same third color, the third cells 300D-3 can be deleted as a result.

FIG. 11 is a schematic diagram illustrating an acquisition processing of the identifier 320D executed by the first acquisition section 101D of the information processing system 10D according to an embodiment of the present invention.

The first acquisition section 101D executes a second filtering processing to acquire a two-dimensional code 315D from the image data 300D. The second filtering processing is a color reduction processing of the second color. When the second filtering processing is executed on the image data 300D, the second cells 300D-2 having the second color can be deleted. Therefore, by the second filtering processing, the image data 300D is converted into the two-dimensional code 315D including the first cells 300D-1 having the first color and the third cells 300D-3 having the third color.

In addition, the second filtering process may be a color addition processing of the second color on the image data 300D. In this case, since the background and the second cells 300D-2 of the image data 300D have the same second color, the second cells 300D-2 can be deleted as a result.

The two-dimensional code 315D includes, as information, an identifier 320D corresponding to the first pattern data 310D. Therefore, the first acquisition section 101D can read the two-dimensional code 315D to acquire the identifier 320D.

Figure 12:
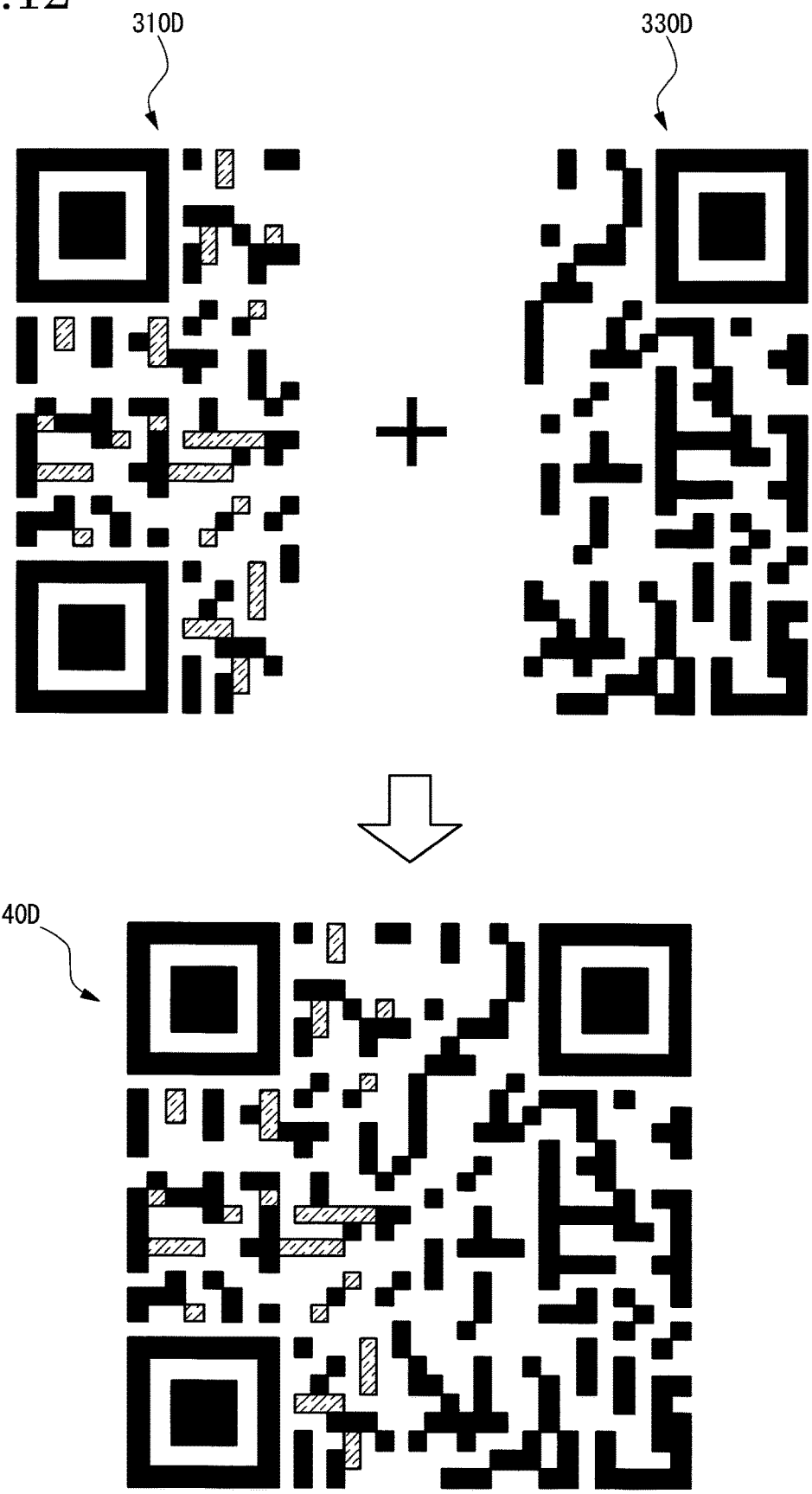
FIG. 12 is a schematic diagram illustrating a two-dimensional code generation processing executed by a generation section of an information processing system according to an embodiment of the present invention.

FIG. 12 is a schematic diagram illustrating a two-dimensional code 340D generation processing executed by a generation section 202D of the information processing system 10D according to an embodiment of the present invention.

The generation section 202D combines the first pattern data 310D with the second pattern data 330D acquired based on the identifier 320D to generate a two-dimensional code 340D. The two-dimensional code 340D includes the authorized information. Therefore, the authorized information can be acquired from the two-dimensional code 340D. A monochrome two-dimensional code may be generated by executing a color conversion processing on the two-dimensional code 340D. In addition, the color conversion processing may be executed on the first pattern data.

According to this embodiment, the information processing system 10D generates the two-dimensional code 340D including the authorized information from the image data 300D of the composite code 500. That is, the information presented to the user is the two-dimensional code 340D including the authorized information acquired by converting the image data 300D by the information processing system 10D or information accompanying the two-dimensional code 340D. On the other hand, simply reading the composite code 500 with the information terminal 11 does not allow acquiring the two-dimensional code 340D including the authorized information. Therefore, it is possible to prevent the two-dimensional code from being electronically duplicated.

Third Embodiment

An information processing system 10E according to an embodiment of the present invention is described with reference to FIGS. 13A and 13B. In addition, when a configuration of the information processing system 10E is similar to the configuration of the information processing system 10, the description thereof may be omitted.

Figure 13A:
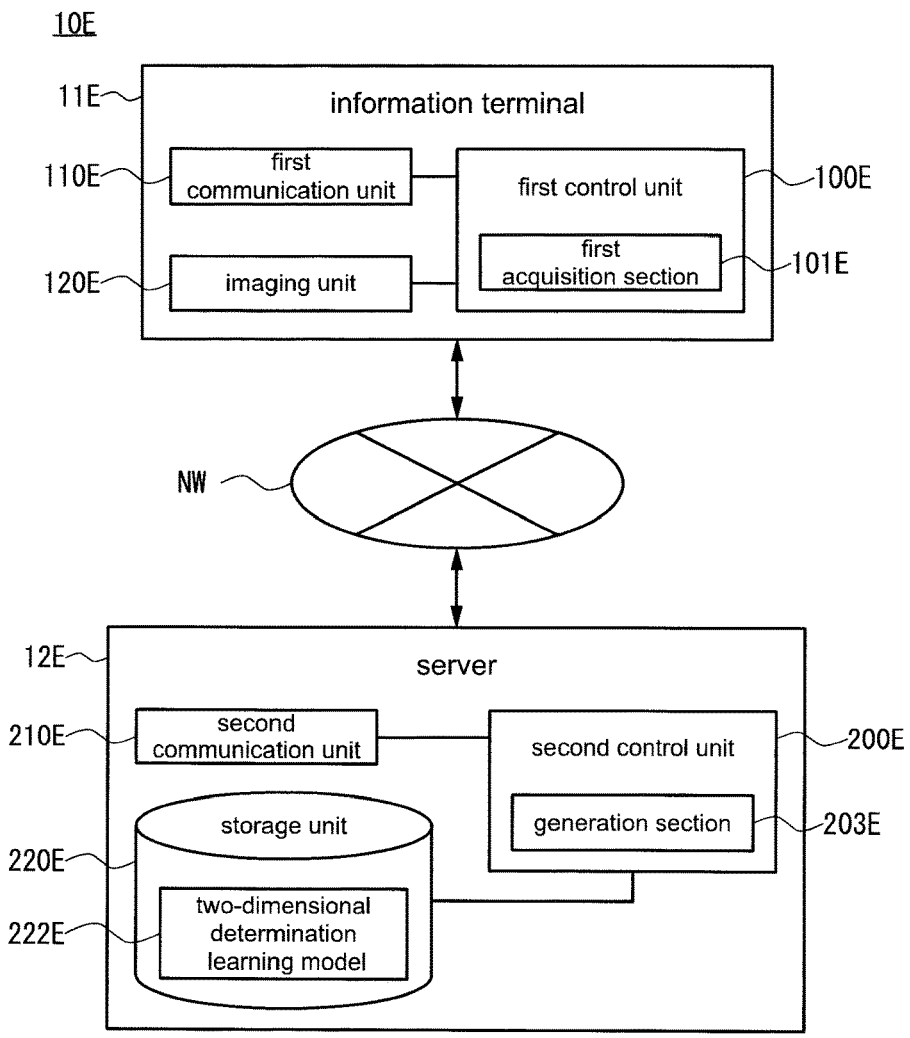
FIG. 13A is a block diagram showing a configuration of an information processing system according to an embodiment of the present invention.

FIG. 13A is a block diagram showing a configuration of the information processing system 10E according to an embodiment of the present invention. FIG. 13B is a flowchart of a two-dimensional code generation processing executed by the information processing system 10E according to an embodiment of the present invention.

As shown in FIG. 13A, an information terminal 11E of the information processing system 10E includes a first control unit 100E, a first communication unit 110E, and an imaging unit 120E. A server 12E of the information processing system 10E includes a second control unit 200E, a second communication unit 210E, and a storage unit 220E. Further, the first control unit 100E includes a first acquisition section 101E, and the second control unit 200E includes a generation section 203E. Furthermore, the storage unit 220E includes a two-dimensional code determination learning model 222E.

The generation section 203E can generate a two-dimensional code by applying the two-dimensional code determination learning model 222E to the first pattern data. The two-dimensional code determination learning model 222E is a learning model in which a two-dimensional code is output when the first pattern data is input. The two-dimensional code determination learning model 222E can learn using deep learning, neural network, machine learning, or the like. For example, the two-dimensional code determination learning model 222E can extract a feature pattern (a feature point) of the first pattern data. A plurality of feature patterns may be extracted from a plurality of portions of the first pattern data. Further, the two-dimensional code determination learning model 222E can compare the extracted feature pattern with the feature pattern of the two-dimensional code and calculate the degree of similarity for each two-dimensional code. When a plurality of feature patterns is extracted, the relative positions of the feature patterns may be compared to calculate the degree of similarity. Furthermore, when the two-dimensional code similarity is greater than or equal to a predetermined threshold, the two-dimensional code determination learning model 222E can identify that the first pattern data corresponds to the two-dimensional code and output the two-dimensional code.

In addition, the first pattern data is a part of the generated two-dimensional code. Therefore, a two-dimensional code database may be stored in the storage unit 220E. In this case, the two-dimensional code determination learning model 222E can compare the match or similarity between the two-dimensional code registered in the two-dimensional code database and the first pattern data, determine the first pattern data, and identify the two-dimensional code corresponding to the first pattern data from the two-dimensional code database.

Figure 13B:
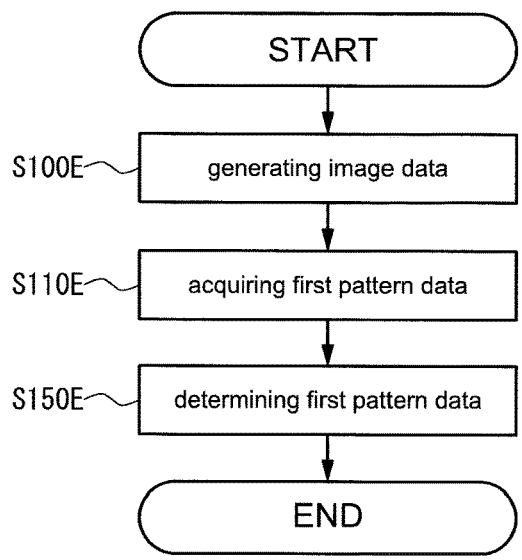
FIG. 13B is a flowchart of a two-dimensional code generation processing executed by an information processing system according to an embodiment of the present invention.

As shown in FIG. 13B, the two-dimensional code generation process executed by the information processing system 10E includes an image data generation processing (step S100E), a first pattern data acquisition processing (step S110E), and a first pattern data determination processing (step S150E).

In step S100E, the imaging unit 120E generates image data of the composite code 500. Further, in step S110E, the first acquisition section 101E acquires first pattern data from the image data.

In step S150E, the generation section 203E determines the first pattern data using the two-dimensional code determination learning model, and generates a two-dimensional code corresponding to the first pattern data.

According to this embodiment, the information processing system 10E generates the two-dimensional code including the authorized information from the image data of the composite code 500. That is, the information presented to the user is the two-dimensional code including the authorized information acquired by converting the image data by the information processing system 10E, or information accompanying the two-dimensional code. On the other hand, simply reading the composite code 500 with the information terminal 11E does not allow acquiring the two-dimensional code including the authorized information. Therefore, it is possible to prevent the two-dimensional code from being electronically duplicated.

Fourth Embodiment

An information processing system 10F according to an embodiment of the present invention is described with reference to FIGS. 14A, 14B, and 15A to 15D. In addition, when a configuration of the information processing system 10F is similar to the configuration of the information processing system 10, the description thereof may be omitted.

Figure 14A:
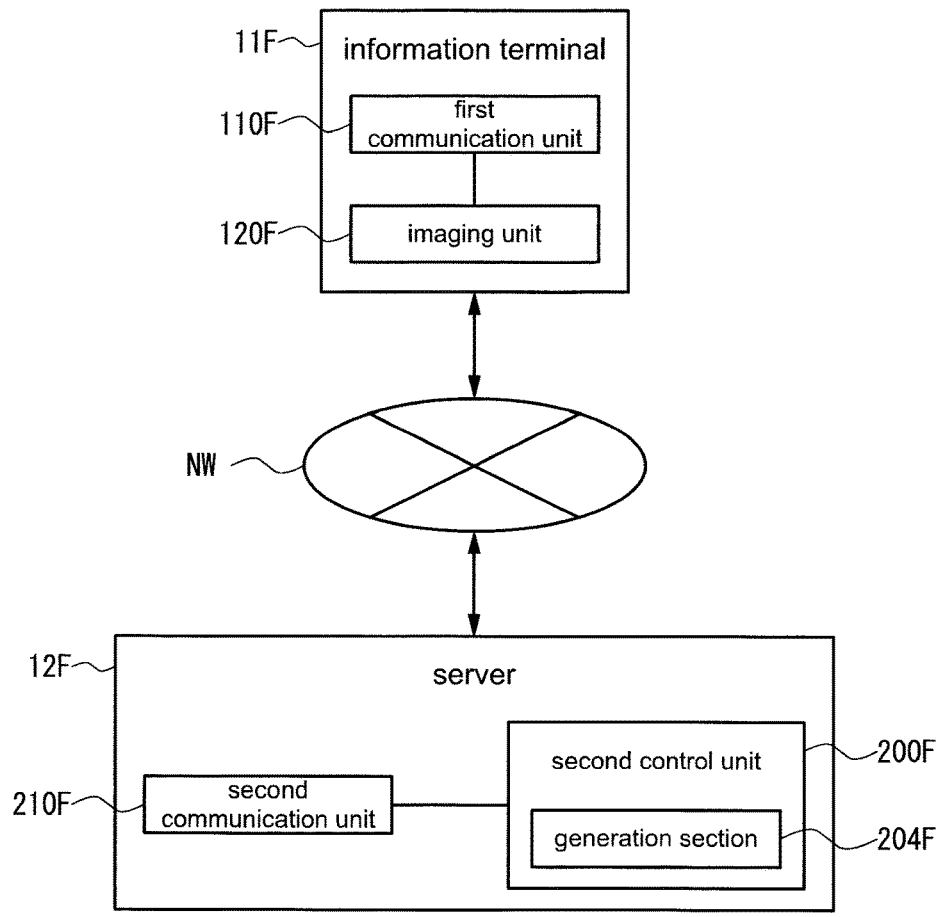
FIG. 14A is a block diagram showing a configuration of an information processing system according to an embodiment of the present invention.
Figure 14B:
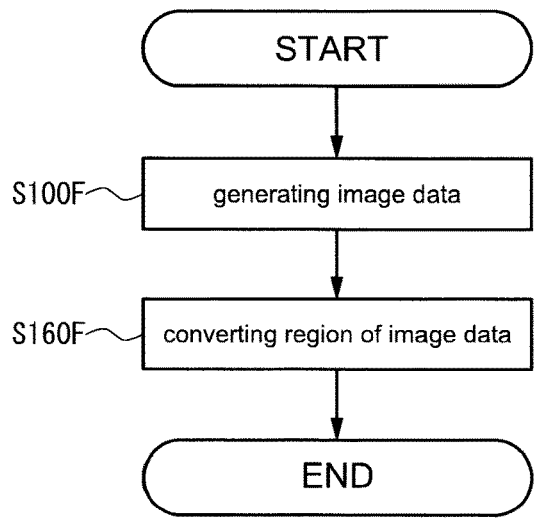
FIG. 14B is a flowchart of a two-dimensional code generation processing executed by an information processing system according to an embodiment of the present invention.

FIG. 14A is a block diagram showing the configuration of the information processing system 10F according to an embodiment of the present invention. FIG. 14B is a flowchart of a two-dimensional code generation processing executed by the information processing system 10F according to an embodiment of the present invention. Further, FIGS. 15A to 15D are schematic diagrams illustrating a two-dimensional code generation processing executed in the information processing system 10F according to an embodiment of the present invention.

As shown in FIG. 14A, an information terminal 11F of the information processing system 10F includes a first communication unit 110F and an imaging unit 120F. A server 12F of the information processing system 10F includes a second control unit 200F and a second communication unit 210F. Further, the second control unit 200F includes a generation section 204F.

The generation section 204F executes a predetermined conversion processing on a predetermined region that is a part of the image data, and generates a two-dimensional code. Although it is preferable that the shape of the predetermined region is a highly symmetrical square, the shape of the predetermined region is not limited thereto. In addition, it is preferable that the predetermined conversion processing is executed on a plurality of predetermined regions. When the predetermined conversion processing is executed on the plurality of predetermined regions, it is difficult to generate the two-dimensional code in a system other than the information processing system 10F because the conversion processing becomes complicated. Therefore, it is difficult to electronically duplicate the two-dimensional code. In addition, details of the predetermined conversion processing are described later.

As shown in FIG. 14B, the two-dimensional code generation processing executed by the information processing system 10F includes an image data generation processing (step S100F) and an image data conversion processing (step S160F).

In step S100F, the imaging unit 120F generates image data 300F of the composite code 500 (see FIG. 15A).

In step S160F, the generation section 204F executes the predetermined conversion processing on the predetermined regions that are parts of the image data. The predetermined conversion processing is, for example, a reversal processing, a rotation processing, or a processing including both the reversal processing and the rotation processing. The reversal processing is a processing of reversing the image using a straight line connecting the midpoints of opposing sides of the region or the opposing vertices of the region as the central axis. In the following description, this may be referred to as a horizontal reversal processing or a vertical reversal processing. Further, the rotation processing is a processing of rotating 90 degrees, 180 degrees, or 270 degrees around the center of the region. Here, it is described that a first region 301F and a second region 302F (see FIG. 15A) are set as predetermined regions in which the predetermined conversion processing of the image data 300F is executed.

The generation section 204F executes the horizontal reversal processing on the first region 301F to generate a third region 303F (see FIG. 15B). Further, the generation section 204F executes a 180 degree rotation processing on the second region 302F to generate a fourth region 304F (see FIG. 15C). That is, the first region 301F and the second region 302F are converted into the third region 303F and the fourth region 304F, respectively. Therefore, the generation section 204F generates a two-dimensional code 340F (see FIG. 15D) including the third region 303F and the fourth region 304F.

In the two-dimensional code generation processing described above, although the inversion processing and the rotation processing have been described as the predetermined conversion processing, the predetermined conversion processing is not limited thereto. The predetermined conversion processing may be a negative/positive inversion processing (in the case of binary data, 0 and 1 are inverted, and in the case of image data, the processing is inverted between black and white), or a replacement processing (the region is replaced with the other pattern data). In addition, in the case of the replacement processing, the pattern data to be replaced can be stored in the storage section of the server 12F.

According to this embodiment, the information processing system 10F generates the two-dimensional code 340F including the authorized information from the image data 300F of the composite code 500. That is, the information presented to the user is the two-dimensional code 340F including the authorized information acquired by converting the image data 300F by the information processing system 10F, or information accompanying the two-dimensional code 340F. On the other hand, simply reading the composite code 500 with the information terminal 11F does not allow acquiring the two-dimensional code 340F including the authorized information. Therefore, it is possible to prevent the two-dimensional code from being electronically duplicated.

Fifth Embodiment

Figure 16A:
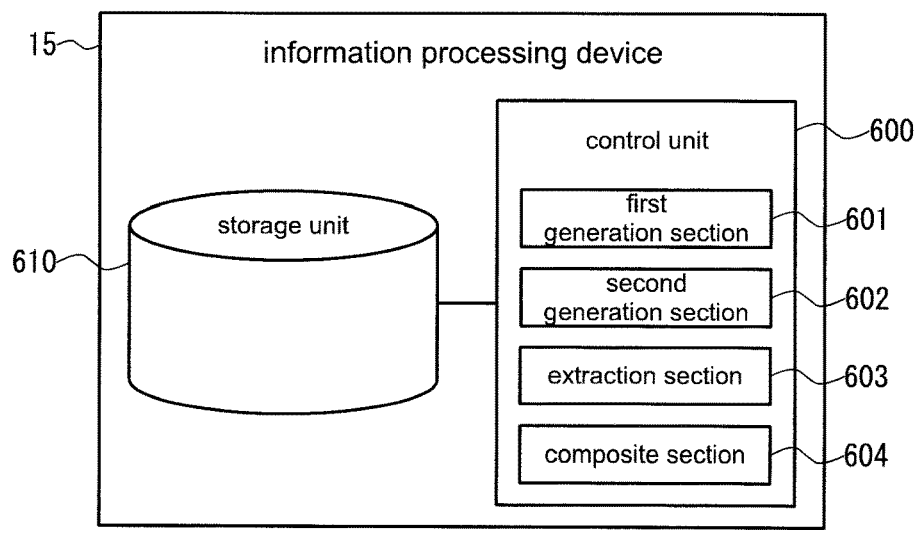
FIG. 16A is a block diagram showing a configuration of an information processing device according to an embodiment of the present invention.
Figure 16B:
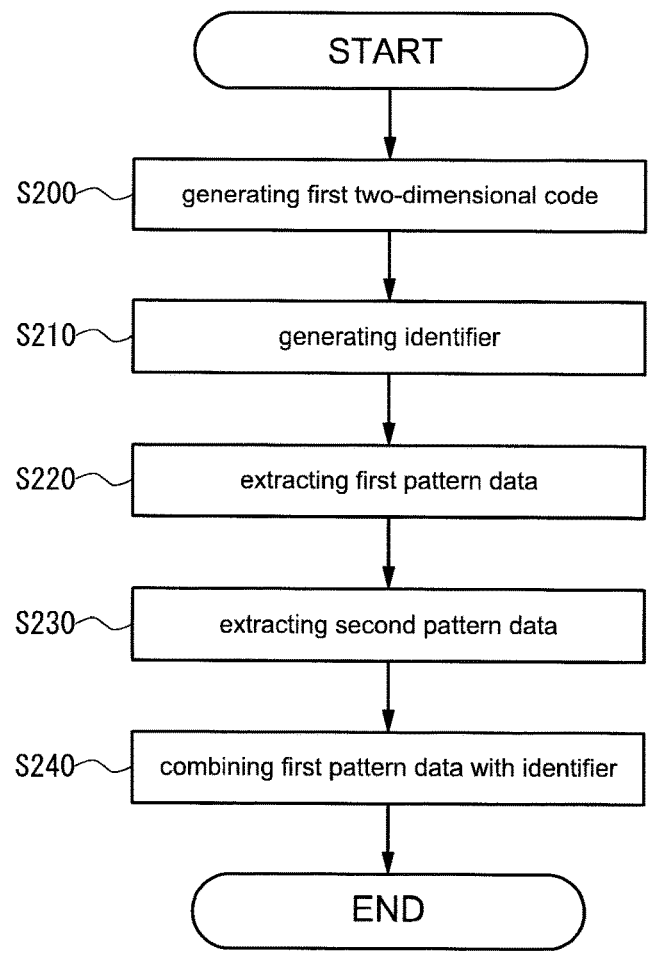
FIG. 16B is a flowchart of a composite code generation processing executed by an information processing device according to an embodiment of the present invention.

An information processing device 15 according to an embodiment of the present invention is described with reference to FIGS. 16A and 16B. The information processing device 15 is a device that generates the composition code capable of being converted by the information processing system 10, the information processing system 10D, or the information processing system 10E (Hereinafter, referred to as "information processing system 10") described in the First to Third Embodiments. That is, the composition code generated by the information processing device 15 is converted into a first two-dimensional code including the authorized information using the information processing system 10. FIG. 16A is a block diagram showing a configuration of the information processing device 15 according to an embodiment of the present invention. FIG. 16B is a flowchart of a composite code generation processing executed by the information processing device 15 according to an embodiment of the present invention.

As shown in FIG. 16A, the information processing device 15 includes a control unit 600 and a storage unit 610. Further, the control unit 600 includes a first generation section 601, a second generation section 602, an extraction section 603, and a composite section 604.

The control unit 600 is a computer that can execute arithmetic processing using data or information. When the control unit 600 executes a program, the first generation section 601, the second generation section 602, the extraction section 603, and the composite section 604 can function.

The first generation section 601 generates a first two-dimensional code including the authorized information. In addition, the first two-dimensional code can be generated using a conventional method.

The second generation section 602 generates an identifier that identifies the first two-dimensional code. Character information, numerical information, graphic data, two-dimensional code, or the like can be used for the identifier. The first two-dimensional code may be stored in the storage unit 610.

The extraction section 603 extracts first pattern data and second pattern data from the first two-dimensional code. Each of the first pattern data and the second pattern data is a part of the first two-dimensional code. As a result, the first two-dimensional code is divided into the first pattern data and the second pattern data. Although the second pattern data includes the part of the first two-dimensional code other than the first pattern data, the second pattern data may include a part of the first pattern data. For example, the second pattern data may include the cutout symbols of the first pattern data. Further, the extraction section 603 associates the second pattern data with the identifier. Thereby, the first two-dimensional code corresponding to the second pattern data can be identified using the identifier. The second pattern data associated with the identifier is stored in the storage unit 610.

The composite section 604 generates a composite code by combining the first pattern data with the identifier. The composite section 604 may combine the first pattern data with the identifier so as not to overlap each other, or may combine the first pattern data with the identifier to overlap each other. The generated composite code can be read by the information processing system 10.

As described above, the storage unit 610 stores the second pattern data associated with the identifier. In addition, the second pattern data may be stored as a database.

Next, the composite code generation processing executed by the information processing device 15 is described with reference to FIG. 16B. The composite code generation process includes steps S200 to S240.

In step S200, the first generation section 601 generates the first two-dimensional code including the authorized information.

In step S210, the second generation section 602 generates the identifier.

In step S220, the extraction section 603 extracts the first pattern data from the first two-dimensional code.

In step S230, the extraction section 603 extracts the second pattern data from the first two-dimensional code. Further, the extraction section 603 associates the second pattern data with the identifier.

In step S240, the composite unit 604 combines the first pattern data with the identifier. As a result, the composite code including the first pattern data and the identifier is generated.

When step S240 is executed, the composite code generation process ends.

In addition, there may be cases in which the second generation section 602 does not generate an identifier. In this case, the electronic data is only the first pattern data. In step S230, the extraction section 603 associates the second pattern data with at least a portion of the first pattern data. Thereby, the second pattern data can be identified from at least the portion of the first pattern data.

According to this embodiment, the information processing device 15 generates the composite code. On the other hand, by simply reading the composite code with the information terminal 11, it is not possible to acquire the first two-dimensional code including the authorized information. Therefore, it is possible to prevent the two-dimensional code from being electronically duplicated.

<Modification 4>

A modification of the information processing device 15 according to the Fifth Embodiment is described with reference to FIGS. 17A to 19. In this modification, a second two-dimensional code is used as the identifier. In addition, when a configuration of this modification is similar to the configuration described above, the description thereof may be omitted.

FIGS. 17A to 19 are schematic diagrams illustrating a composite code generation process executed by the information processing device 15 according to an embodiment of the present invention.

Figure 17A:
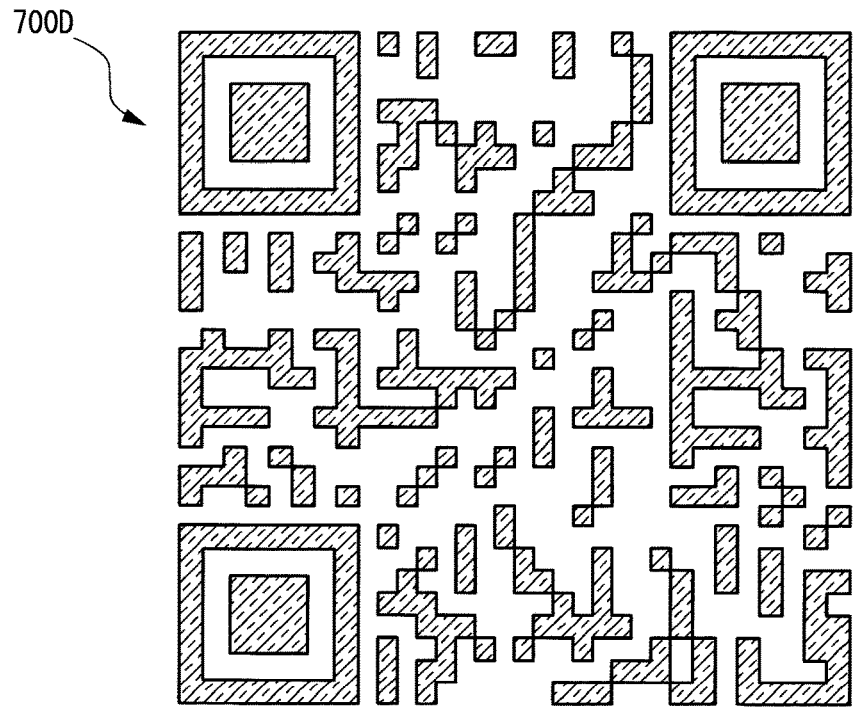
FIG. 17A is a schematic diagram illustrating a composite code generation process executed by an information processing device according to an embodiment of the present invention.
Figure 17B:
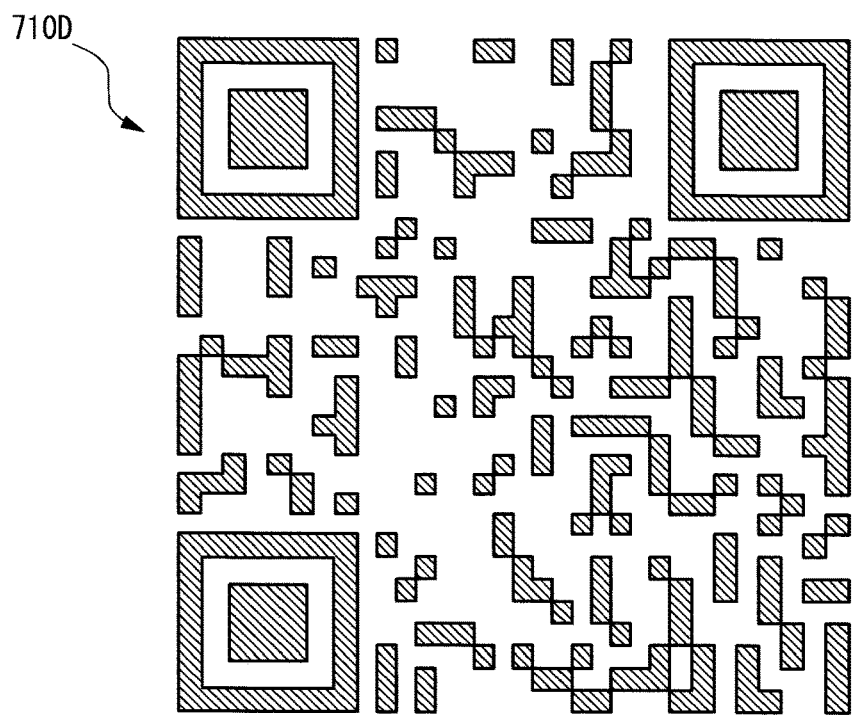
FIG. 17B is a schematic diagram illustrating a composite code generation process executed by an information processing device according to an embodiment of the present invention.

In this modification, in step S200, the first generation section 601 generates a first two-dimensional code 700D having a second color (see FIG. 17A). Further, in step S210, the second generation section 602 generates a second two-dimensional code 710D having a third color (see FIG. 17B).

In step S220, the extraction section 603 extracts first pattern data 700D-1 from the first two-dimensional code 700D (see (S1) in FIG. 18). Further, the extraction section 603 extracts second pattern data 700D-2 from the first two-dimensional code 700D (see (S2) in FIG. 18). Furthermore, the extraction section 603 associates the second pattern data 700D-2 with a second two-dimensional code 710D.

Figure 19:
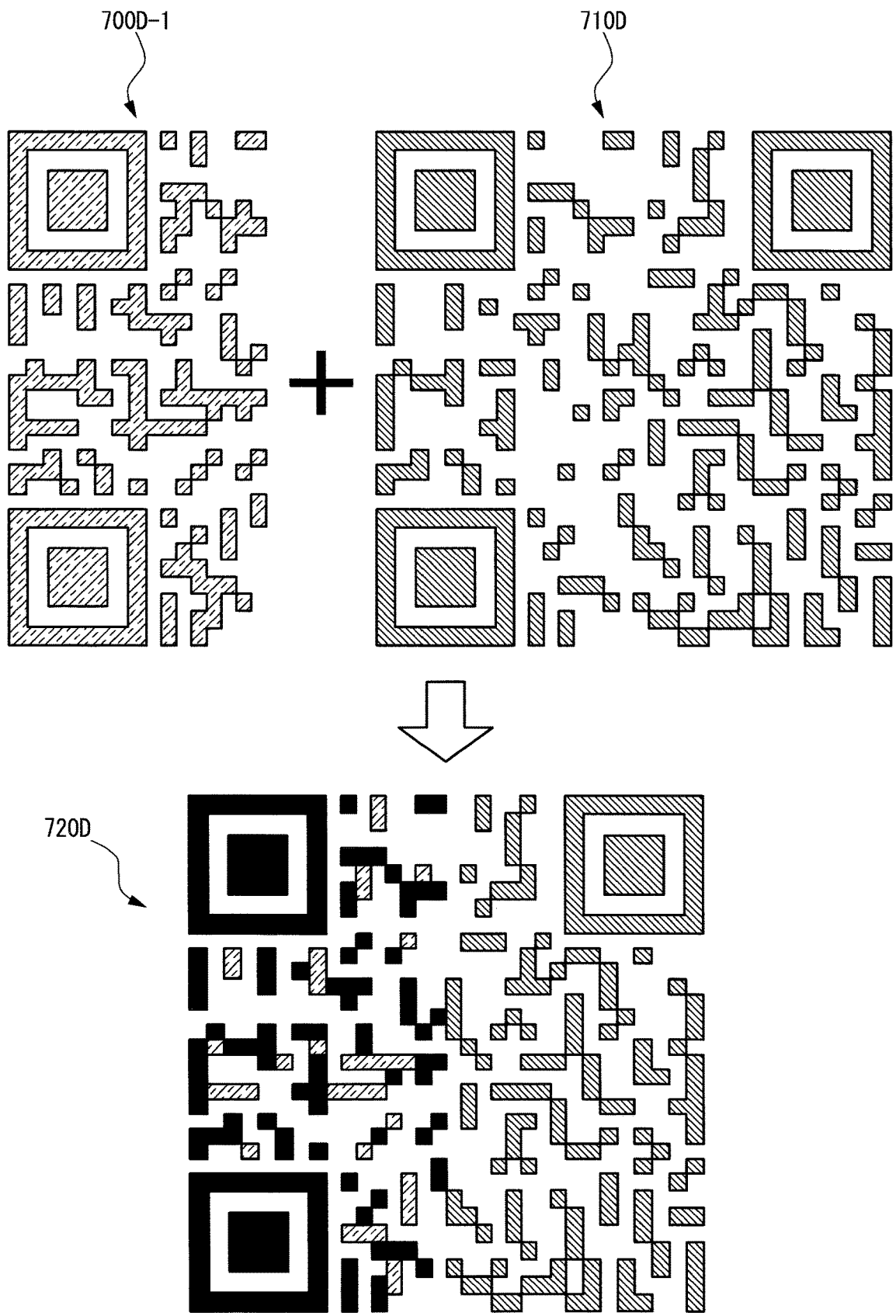
FIG. 19 is a schematic diagram illustrating a composite code generation process executed by an information processing device according to an embodiment of the present invention.

In step S240, the composite section 604 combines the first pattern data 700D-1 with the second two-dimensional code 710D (see FIG. 19). For example, the first pattern data 700D-1 and the second two-dimensional code are combined so that two cutout symbols of the first pattern data 700D-1 and two cut-out symbols of the second two-dimensional code 710D overlap each other. At this time, the portion where the first pattern data 700D-1 and the second two-dimensional code 710D overlap is converted to a first color. Two overlapping cutout symbols of the first two-dimensional code 340-1 and the second two-dimensional code 340-2 are also converted to the first color. As a result, a composite code (third two-dimensional code 720D) having the first color, the second color, and the third color is generated.

Also in this modification, the information processing device 15 generates the composite code (the third two-dimensional code 720D). On the other hand, by simply reading the composite code with the information terminal 11, it is not possible to acquire the first two-dimensional code 700D including the authorized information. Therefore, it is possible to prevent the two-dimensional code from being electronically duplicated.

Sixth Embodiment

An information processing device 15F according to an embodiment of the present invention is described with reference to FIGS. 20A and 20B. The information processing device 15F is a device that generates a composite code (second two-dimensional code) capable of being converted by the information processing system 10F described in the Fourth Embodiment. That is, the second two-dimensional code generated by the information processing device 15F is converted into the first two-dimensional code including the authorized information using the information processing system 10F.

Figure 20A:
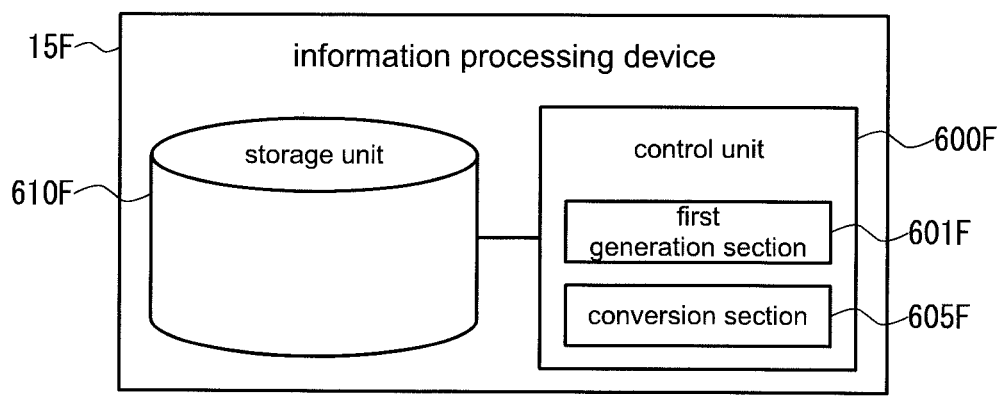
FIG. 20A is a block diagram showing a configuration of an information processing device according to an embodiment of the present invention.
Figure 20B:
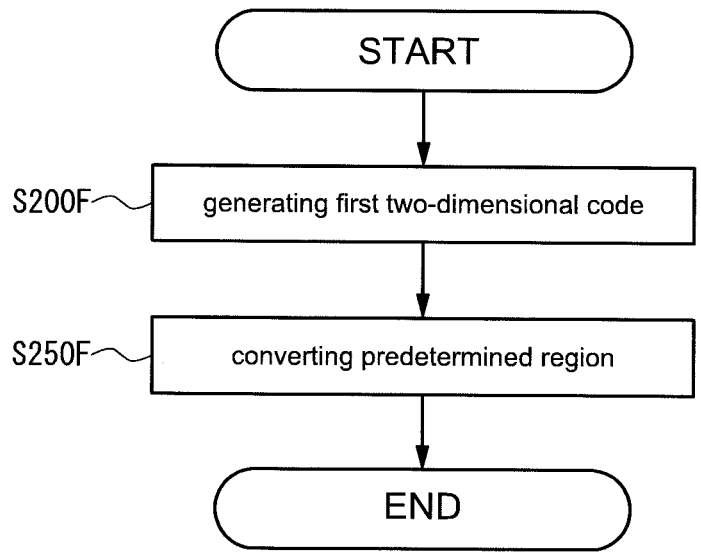
FIG. 20B is a flowchart of an image data generation processing executed by an information processing device according to an embodiment of the present invention.

FIG. 20A is a block diagram showing a configuration of the information processing device 15F according to an embodiment of the present invention. FIG. 20B is a flow-chart of an image data generation processing executed by the information processing device 15F according to an embodiment of the present invention.

As shown in FIG. 20A, the information processing device 15F includes a control unit 600F and a storage unit 610F. Further, the control unit 600F includes a first generation section 601F and a conversion section 605F.

The control unit 600F is a computer that can execute arithmetic processing using data or information. When the control unit 600F can execute a program, the first generation section 601F and conversion section 605F can function.

The first generation section 601F generates the first two-dimensional code including the authorized information.

The conversion section 605F executes a predetermined conversion processing on a predetermined region that is a part of a first two-dimensional code to generate a second two-dimensional code. That is, the conversion section 605F can convert the first two-dimensional code that includes the authorized information into the second two-dimensional code that does not include the authorized information. Although it is preferable that the shape of the predetermined region is a highly symmetrical square, the shape of the predetermined region is not limited thereto. In addition, it is preferable that the predetermined conversion processing is executed on a plurality of predetermined regions.

The storage unit 610F stores the second two-dimensional code. In addition, the first two-dimensional code may be stored. The second two-dimensional code can be used as the composite code.

Next, the second two-dimensional code generation processing executed by the information processing device 15F is described with reference to FIG. 20B. The second two-dimensional code generation processing executed by the information processing device 15F includes a first two-dimensional code generation processing (step S200F) and a conversion processing of a predetermined region of the first two-dimensional code (step S250F).

In step S200F, the first generation section 601F generates the first two-dimensional code including the authorized information.

In step S250F, the conversion section 605F executes the predetermined conversion processing on the predetermined region that is a part of the first two-dimensional code to generate the second two-dimensional code.

When step S250F is executed, the second two-dimensional code generation process ends.

According to this embodiment, the composite code (the second two-dimensional code) is generated by the information processing device 15F. On the other hand, simply reading the second two-dimensional code with the information terminal 11F does not allow acquiring the first two-dimensional code including the authorized information. Therefore, it is difficult to prevent electronic duplication of the two-dimensional code.

As described in each embodiment, an information processing system according to an embodiment of the present invention converts electronic data (for example, image data acquired by capturing) corresponding to a composite code (including a two-dimensional code) into a two-dimensional code including authorized information. Therefore, since the authorized information cannot be acquired by simply reading the composite code with an information terminal, electronic duplication of the two-dimensional code including the authorized information can be prevented.

Each of the embodiments described above as an embodiment of the present invention can be appropriately combined and implemented as long as they do not contradict each other. Additions, deletions, or design changes of constituent elements, or additions, omissions, or changes to conditions of steps as appropriate based on the respective embodiments are also included within the scope of the present invention as long as the gist of the present invention is provided.

Further, other effects which differ from those brought about by each of the embodiments described above, but which are apparent from the description herein or which can be readily predicted by those skilled in the art, are naturally understood to be brought about by the present invention.

What is claimed is:

1. An information processing system comprising:
   a first acquisition section configured to acquire first pattern data from electronic data;
   a second acquisition section configured to acquire second pattern data from a database; and
   a generation section configured to combine the first pattern data with the second pattern data to generate a two-dimensional code,
   wherein the electronic data is image data,
   wherein the first acquisition section is further configured to acquire an identifier from the image data, and
   wherein the second acquisition section is configured to acquire the second pattern data based on the identifier.

2. The information processing system according to claim 1, wherein the identifier is acquired by executing an OCR processing on the image data.

3. The information processing system according to claim 1, wherein the identifier is acquired from data other than the first pattern data of the image data.

4. The information processing system according to claim 1, wherein the identifier is acquired from information included in the image data.

5. The information processing system according to claim 1,
   wherein the first pattern data is acquired by executing a first filtering processing on the image data, and wherein the identifier is acquired by executing a second filtering processing on the image data.

6. The information processing system according to claim 5,
wherein the image data comprises a first cell having a first color, a second cell having a second color, and a third cell having a third color,
wherein the first color, the second color, and the third color are different from each other,
wherein the first filtering processing is a color reduction processing or a color addition processing of the third color, and
wherein the second filtering processing is a color reduction processing or a color addition processing of the second color.

7. An information processing system comprising:
a first acquisition section configured to acquire first pattern data from electronic data including dummy information, and an identifier from pattern data other than the first pattern data;
a second acquisition section configured to acquire second pattern data from a database based on the identifier; and
a generation section configured to combine the first pattern data with the second pattern data to generate a two-dimensional code,
wherein each of the first pattern data and the pattern data other than the first pattern data includes a part of the dummy information.

8. The information processing system according to claim 7, wherein the electronic data is binary data.

9. The information processing system according to claim 7, wherein the electronic data is image data.

10. An information processing system comprising:
a first acquisition section configured to acquire first pattern data from electronic data including dummy information, and an identifier from pattern data other than the first pattern data;
a second acquisition section configured to acquire second pattern data from a database based on the identifier; and
a generation section configured to combine the first pattern data with the second pattern data to generate a two-dimensional code,
wherein the first pattern data is acquired after performing predetermined conversion processing on a predetermined region that is a part of the electronic data.

11. The information processing system according to claim 10, wherein the electronic data is binary data.

12. The information processing system according to claim 10, wherein the electronic data is image data.

13. The information processing system according to claim 10, wherein the predetermined conversion processing is a reversal processing, a rotation processing, a negative/positive reversal processing, a replacement processing, or a combination thereof.

* * * * *